(12) United States Patent
Fujii et al.

(10) Patent No.: US 7,215,704 B2
(45) Date of Patent: May 8, 2007

(54) ADAPTIVE EQUALIZING APPARATUS AND PROGRAM THEREFOR

(75) Inventors: Hiromasa Fujii, Yokosuka (JP); Tetsushi Abe, Yokohama (JP); Shigeru Tomisato, Okayama (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 774 days.

(21) Appl. No.: 10/670,562

(22) Filed: Sep. 26, 2003

(65) Prior Publication Data

US 2004/0062302 A1    Apr. 1, 2004

(30) Foreign Application Priority Data

Sep. 27, 2002  (JP)  ............................. 2002-283617
Jul. 8, 2003    (JP)  ............................. 2003-193906

(51) Int. Cl.
*H03H 7/30* (2006.01)
(52) U.S. Cl. ...................... 375/232; 375/346; 375/350
(58) Field of Classification Search ................ 375/232, 375/229, 233, 234, 346, 350
See application file for complete search history.

(56) References Cited

U.S. PATENT DOCUMENTS

2002/0016560 A1    2/2002    Hansen

FOREIGN PATENT DOCUMENTS

JP    2002-33685    1/2002

OTHER PUBLICATIONS

Daryl Reynolds, et al., "Low-Complexity Turbo-Equalization for Diversity Channels", Signal Processing 81 (2001), pp. 989-995.
Hiroo Omori, et al., "A Matched Filter Approximation for SC/MMSE Iterative Equalizers", IEEE Communications Letters, vol. 5, No. 7, Jul. 2001, pp. 310-312.
Siriklat Lek Ariyavisitakul, "Turbo Space-Time Processing to Improve Wireless Channel Capacity", IEEE Transactions on Communications, vol. 48, No. 6, Aug. 2000, pp. 1347-1359.
Padam L. Kafle, et al., "Performance of Turbo Coded Multicarrier CDMA with Iterative Multiuser detection and Decoding", Electrical and Computer Engineering, Canadian Conference, vol. 1, XP-010550822, May 13, 2001, pp. 105-110.

*Primary Examiner*—Emmanuel Bayard
(74) *Attorney, Agent, or Firm*—Oblon, Spivak, McClelland, Maier & Neustadt, P.C.

(57) ABSTRACT

In an adaptive equalizing apparatus for MIMO (Multi-Input Multi-Output) turbo reception, an interference component in a received signal is subtracted therefrom using a replica of an interference component in an interference canceling part $31_n$, the subtracted output is filtered by a filter $32_n$, to cancel the remaining interference component and to perform multipath combining, and in a degree-of-interference-cancellation estimation part $41_n$ the degree of interference cancellation $\beta(i)$ is set such that it is 0 for the iteration number i=1, 0.8+0.05 (i−1) for $5 \geq i \geq 2$ and 1 for $i \geq 6$, and at the beginning of each iteration filter coefficients are calculated using $\beta(i)$ and a channel estimation value in a filter coefficient calculating part $33_n$, and the filter coefficient thus calculated are set in the filter $32_n$. An average value of soft decision symbol estimation values used in the interference canceling part may be used as $\beta$.

10 Claims, 19 Drawing Sheets

ADAPTIVE EQUALIZING APPARATUS AND PROGRAM THEREFOR

BACKGROUND OF THE INVENTION

1. Technical Field

The present invention relates to an adaptive equalizing apparatus for use in a turbo receiver or the like which iterates equalization and decoding and, more particularly, to an adaptive equalizing apparatus which cancels interference by use of a priori information and then further suppresses interference and combines multipath components by filtering. The invention also pertains to a program for implementation of such an adaptive equalizing apparatus.

2. Prior Art

The problem to be tackled in the mobile communication business is how to accommodate a great many users (mobile stations) on a limited number of frequencies with high quality. A solution to this problem is a MIMO (Multiple-Input Multiple-Output) system such as shown in FIG. 1. In this system, letting j represent a bit index, symbols generated from information bits $b_1(j)$ to $b_N(j)$ are sent from a plurality of transmitters S1 to SN at the same point in time and at the same frequency, and these transmitted signals are received by a MIMO receiver 30 equipped with antennas #1 to #M. The MIMO receiver 30 processes the received signals to estimate the information bits $b_1(j)$ to $b_N(j)$ forming the symbols sent from the transmitters S1 to SN, and outputs the estimated information bits as $b_1'(j)$ to $b_N'(j)$ to output terminals $Out_1$ to $Out_N$, respectively.

A concrete configuration scheme of the MIMO receiver in the MIMO system is still under study. In the case of using the MLS (Maximum Likelihood Sequence Estimation) criterion for the configuration of the MIMO receiver configuration in the MIMO system, letting N represent the number of transmitters, P the number of constellation points and Q the number of multi-paths over which the transmit signal from each transmitter reaches each antenna of the MIMO receiver, the computational complexity of the MIMO receiver becomes enormous with an increase in the number N of transmitters and in the number Q of multi-paths since the computational complexity increases in proportion to $P^{(Q-1)N}$. Further, in the case of receiving information sent as plural parallel signals from a single user, separation of each parallel signal calls for larger amounts of computations with an increase in the number of multi-paths. From this point of view, the present invention is of great utility especially when applied to a turbo receiver for multiple stream signals, but the invention is also effective in a turbo receiver for a single user (one transmitter), that is, for a single stream signal, and receivers of other systems. A description will be given first of a conventional single-user turbo receiver.

Single-User Turbo Receiver

FIG. 2 shows, by way of example, the configurations of a transmitter and a receiver in this case. In a transmitter 10 an input information bit stream b(j) is subjected to error correction encoding by a channel encoder 11 to generate a coded bit stream c(j). The stream c(j) is interleaved by an interleaver 12 into a stream c(k), which is used to modulate a carrier signal in a symbol mapping part 13 into a transmit symbol stream s(k). And the transmit symbol stream s(k) is added by multiplexing means 15 with a training symbol $s_{tr}(k)$ from a training symbol stream generator 14, thereafter being transmitted. In general, the transmit symbol stream s(k) is transmitted after being converted to the radio frequency band.

This transmit signal is sent over a transmission channel (each multi-path channel) to a receiver 20. In the receiver 20 a SISO (Soft-Input-Soft-Output) equalizer 21 equalizes delayed waves. The input signal r(k) received by the receiver 20 is usually converted in a receiving part (not shown) from the high-frequency to the base band, and base band received signal is sampled at a frequency one or more times higher than the symbol frequency of the transmit symbol stream to generate a digital signal, which is input as a digital received signal r(k) to the equalizer 21.

In the case of a single user, that is, when N=1 in FIG. 1, the received output from each receiving antenna #m (where m=1, 2, . . . , M) can be expressed as follows.

$$r_m(k) = \sum_{q=0}^{Q-1} h_m(q) \cdot s(k-q) + v_m(k)$$

where m is an antenna index, k is discrete time, h is a channel value (channel impulse response: channel characteristic), s(k) is a transmit symbol of the user (the transmitter 1), and $v_m(k)$ is an internal thermal noise of the receiver 20. And, the following equation is defined with the outputs from all the antennas #1 to #M represented as a vector r(k).

$$r(k) = [r_1(k) r_2(k) \ldots r_M(k)]^T$$
$$= \sum_{q=0}^{Q-1} H(q) \cdot s(k-q) + v(k)$$

where:

$$v(k) = [v_1(k) v_2(k) \ldots v_M(k)]^T$$
$$H(q) = [h_1(q) h_2(q) \ldots h_M(q)]^T$$

$T$ indicates a transposed vector (or matrix). Next, the following vector and matrix are defined taking the number Q of multi-paths (channels) into consideration. In the following description, symbols added with m=1, . . . , M and n=1, . . . , N as subscripts, respectively, denote indices to elements of vectors or matrices.

$$y(k) \equiv [r^T(k+Q-1) r^T(k+Q-2) \ldots r^T(k)]^T$$
$$\equiv H \cdot S(k) + n(k)$$

where:

$$H = \begin{bmatrix} H(0) & \cdots & H(Q-1) & & 0 \\ & \ddots & & \ddots & \\ 0 & & H(0) & \cdots & H(Q-1) \end{bmatrix}$$

$$S(k) = [s(k+Q-1) s(k+Q-2) \ldots s(k-Q+1)]^T$$
$$n(k) = [v^T(k+Q-1) v^T(k+Q-2) \ldots v^T(k)]^T$$

The following description will be given on the assumption of using the BPSK modulation scheme. In multivalued modulation using many values, too, the prior art and the present invention can easily be extended by appropriate symbol mapping and demapping. The vector r(k) defined above is input to the equalizer 21. The SISO equalizer 21 is a linear equalizer, from which is derived, as its equalized output, LLR (Log-Likelihood Ratio) $\Lambda_1$ between the probabilities that each coded bit s(k) is +1 and −1.

$$\Lambda_1[s(k)] = \log\frac{Pr[s(k) = +1 \mid y(k)]}{Pr[s(k) = -1 \mid y(k)]}$$

$$= \lambda_1[s(k)] + \lambda_2^P[s(k)]$$

where $\lambda_1[s(k)]$ is external information that is sent to a subsequent decoder 24 and $\lambda_2^P[s(k)]$ is a priori information that is sent to the equalizer 21. The LLR $\Lambda_1[s(k)]$ is fed to a subtractor 22, by which the a priori information $\lambda_2^P[s(k)]$ is subtracted, and the subtracted output is provided to a de-interleaver 23, wherein it is subjected to de-interleaving opposite to that by the interleaver 12 to provide ), $\lambda_1[s(j)]$, which is fed to a SISO channel decoder 24. The decoder 24 performs SISO decoding by use of redundancy for the error correction added by the encoder 11 of the transmitter and outputs a decoded bit b'(j) as a temporary or final received signal, and calculates an LLR $\Lambda_2$ for each bit by the following equation.

$$\Lambda_2[s(j)] = \log\frac{Pr[s(j) = +1 \mid \lambda_1[s(j), j = 0, \ldots, B-1]}{Pr[s(j) = -1 \mid \lambda_1[s(j), j = 0, \ldots, B-1]}$$

$$\equiv \lambda_2[s(j)] + \lambda_1^P[s(j)]$$

The output $\lambda_1[s(j)]$ from the deinterleaver 23 is provided as a priori information $\lambda_1^P[s(j)]$ to a subtractor 25, by which the a priori information $\lambda_1^P[s(j)]$ is subtracted from $\Lambda_2[s(j)]$. The resulting $\lambda_2[s(j)]$ is provided as external information $\lambda_2^P[s(k)]$ via an interleaver 26 to the equalizer 21 and the subtractor 22 during iteration processing. Depending on reception processing scheme, $\Lambda_1[s(k)]$ and $\Lambda_2[s(k)]$ may be replaced with $\lambda_1^P[s(k)]$ and $\lambda_2^P[s(k)]$, respectively. In this way, equalization and decoding are carried out iteratively to provide increased error rate.

Next, a detailed description will be given of the calculation of a linear filter that the equalizer 21 applies to a received vector y(k). The equalizer 21 uses the a priori information $\lambda_2^P[s(k)]$ to calculate the following soft decision symbol estimated value.

$$s'(k) = \tanh[\lambda_2^P[s(k)]/2]$$

Further, the equalizer 21 uses the estimated value and a channel matrix H to generate a replica of an interference component, $H \cdot S'(k)$, which is subtracted from the received signal. That is, $$Y'(k) \equiv y(k) - H \cdot S'(k)$$

$$= H \cdot (S(k) - S'(k)) + n(k)$$

where $$S'(k) = [s'(k+Q-1) \ldots s'(k+1)0s'(k-1) \ldots s'(k-Q+1)]^T$$

Since the replica $H \cdot S'(k)$ of the interference component is not exactly accurate, the interference component cannot completely be canceled by this processing. Then, optimum linear filter coefficients $w_{opt}(k)$ for complete cancellation of the remaining interference component are calculated by the following MMSE (Minimum Mean Square Error) criterion.

$$w_{opt}(k) = \arg\min \|w^H(k) \cdot y'(k) - s(k)\|^2$$

where $^H$ represents a conjugate transposition and $\|*\|$ represent the norm, then w(k) is calculated which minimizes the above equation.

The following scheme for the derivation of w(k) is described, for example, in Daryl Reynolds and Xiaodong Wang, "Low Complexity Turbo-Equalization for Diversity Channels," ELSEVIER, Signal Processing, 81(2001), pp. 989–995. One of the primary challenges by the scheme is a sharp reduction of computational complexity. The computational complexity of the conventional MLSE turbo is in proportion to the order of $P^{Q-1}$ (where P is the number of signal points of the transmit symbol), whereas according to this scheme the complexity is kept down to the order of $Q^3$. Incidentally, $w^H(k) \cdot y'(k)$ is the output from the equalizer 21, from which is calculated $\lambda_1[s(k)]$, which is provided via the de-interleaver 23 to the decoder 24 for decoding calculation.

There is proposed a method by which approximates the absolute value of a soft decision symbol estimated value $s'_n(k)$ to 1 in second and subsequent rounds of MMSE filter coefficients calculation in single-user turbo reception (see, for example, H. Ohmori, T. Asai, T. Matsumoto, "A matched filter approximation for SC/MMSE Iterative Equalizers," IEEE Trans. Commun. Letters, vol., no. 7, pp. 310–312, July 2001).

Next, a description will be given of the turbo reception method set forth in European Patent Publication EP1233565A2 (corresponding U.S. Patent Application Publication No. 2002-016560-A1) which is an extension of the single-user turbo reception to a multi-user turbo reception method. Since the configuration of one user (transmitter n (where n=1, . . . , N) for the multi-input multi-output turbo reception method is the same as the transmitter configuration shown in FIG. 2, reference characters denoting the signal stream corresponding to that of the user n are each attached with a subscript n and put in parentheses.

Letting Q represent the number of multi-paths over which radio waves propagate from one transmitting antenna to one receiving antenna, the signal that is received by an m-th (where m=1, . . . , M) antenna #m is a signal that has convoluted a delay profile (channel characteristic) $h_{mn}(q)$ in the transmit signal $s_n$ from the transmitter Sn, and the signal $r_m(k)$ received by the m-th antenna #m is a combined version of received signals from all the transmitters S1 to SN and added with noise. Accordingly, the received signal $r_m(k)$ is given by the following equation.

$$r_m(k) = \sum_{q=0}^{Q-1} (h_{mn}(q) s_n(k-q)) + n_m(k) \quad (1)$$

Where $n_m(k)$ is an additive white Gaussian noise (AWGN) for the signal received by the m-th antenna #m.

In this specification, the following definition is given for convenience in writing the channel status (channel characteristic).

$$r(k) = [r_1(k) r_2(k) \ldots r_M(k)]^T \quad (2)$$

-continued $$= \sum_{q=1}^{Q} H(q)S(k-q) + n(k)$$

where k is discrete time, $^T$ represents a transposed matrix or vector, and H(q), S(k) and n(k) are as follows.

$$H(q) = \begin{bmatrix} h_{11}(q) & h_{12}(q) & \cdots & h_{1N}(q) \\ h_{21}(q) & h_{22}(q) & \cdots & h_{2N}(q) \\ \vdots & \vdots & \ddots & \vdots \\ h_{M1}(q) & h_{M2}(q) & \cdots & h_{MN}(q) \end{bmatrix} \quad (3)$$

$$S(k) = [s_1(k)s_2(k) \ldots s_N(k)]^T \quad (4)$$

$$n(k) = [n_1(k)n_2(k) \ldots n_M(k)]^T \quad (5)$$

FIG. 3 shows the functional configuration of the MIMO turbo receiver. The MIMO space-time turbo receiver is formed by a MIMO equalizer 20A and decoding parts 20B$_1$ to 20B$_N$ for respective signal streams (users), and reduces the bit error rate by iterating equalization and decoding of the same received signal. The received signals from antennas #1 to #M are input to the space-time turbo equalizer 20A as base-band digital signals $r_1(k) \ldots, r_N(k)$ each sampled with the symbol period, for instance. The MIMO equalizer 20A: generates a replica of the received interference signal by use of a second external information value (a second a priori information stream) which is fed back from a SISO (Soft-Input Soft-Output) decoder 24A$_n$ in the preceding iteration of equalization and decoding; removes MAI (Multiple Access Interference) and ISI (Inter-Symbol Interference) from the received signal r(k) by use of the received interference signal replica; and calculates a first external information value (first a priori information stream) $\lambda_1[s_n(k)]$ of each symbol by MMSE filtering. Incidentally, since in the first round of MIMO equalization for each frame it is impossible to utilize the second external information value $\lambda_2[s_n(k)]$ obtainable in the previous iteration, the equalizer 20A performs only the equalization by the MMSE filter. The decoding part for the signal stream n (SISO decoding part for each user) 20B$_n$ de-interleaves, by a de-interleaver 23, the first external information value $\lambda_1[s_n(k)]$ calculated by the MIMO equalizer 20A and subjects the de-interleaved output to SISO decoding by a SISO decoder 24A$_n$. The second external information value $\lambda_2[s_n(k)]$ obtained by the SISO decoding for each symbol $s_n(j)$ is interleaved by an interleaver 26 and fed back to the MIMO equalizer 20A as the second a priori information $\lambda_2^P[s_n(k)]$.

FIG. 4 illustrates the configuration of the MIMO equalizer 20A. The MIMO equalizer 20A comprises a channel estimation part 21C, equalization parts 21A$_1$ to 21A$_N$ corresponding to respective signal streams, and a training symbol generating part 29, and each equalization part 21A$_n$ is made up of an adaptive equalization part 27$_n$ and an external information generating part 28$_n$. The channel estimation part 21C estimates the channel status (transmission channel characteristic) based on the received signal and a training symbol fed from the training symbol generating part 29.

FIG. 5 depicts the configuration of the adaptive equalization part 27$_n$, which comprises an interference canceling part 31$_n$, an MMSE filtering part 32$_n$, and a filter coefficient calculating part 33$_n$. FIG. 6 shows an example of the configuration of the interference canceling part 31$_n$. Referring first to FIG. 6, a replica generator 34$_n$ generates a received interference signal replica of the interference (MAI, ISI) component in the received signal based on the second a priori information streams $\lambda_2[s_1(k)], \ldots, \lambda_2[s_N(k)]$ (except $\lambda_2[s_n(k)]$) and an estimated channel status (a channel estimated value) H, and a subtractor 35$_n$ subtracts the interference signal replica $Hu_{e,n}(k)$ from the received signal r(k). An estimated value (soft decision symbol estimated value) $s'_n(k)$ of the transmit signal $s_n(k)$ of each user is calculated by the following equation from the second a priori information value $\lambda_2[s_n(k)]$.

$$s'_n(k) = \tanh(\lambda_2[s_n(k)]/2) \quad (6)$$

The soft decision symbol estimated value $s'_n(k)$ is a transmit signal replica of a magnitude corresponding to its degree of reliability. The estimated value $U_{e,n}(k)$ of the signal which becomes an interference component of the transmit signal $s_n(k)$ from the transmitter Sn at time k is as follows:

$$U_{e,n}(k) = [u_n(k+(Q-1))u_n(k+(Q-2)) \ldots u_n(k+1)U_{en}(k) \\ U_n(k-1) \ldots u_n(k-(Q-1))]^T \quad (7)$$

$$u_n(k) = [s'_1(k)s'_2(k) \ldots s'_N(k)] \quad (8)$$

$$u_{en}(k) = [s'_1(k)s'_2(k) \ldots s'_{n-1}(k)0s'_{n+1}(k) \ldots s'_N(k)] \quad (9)$$

By generating the received interference signal replica $Hu_{e,n}(k)$ for the interference component $u_{e,n}(k)$ and canceling the replica in the received signal r(k), it is possible to obtain an estimated value $r'_{s,n}(k)$ of the received signal for the transmit symbol $s_n(k)$ from the transmitter Sn at time k which is the symbol to be detected. That is, the estimated value $r'_{s,n}(k)$ is given by the following equation.

$$r'_{s,n}(k) = r_e(k) - Hu_{e,n}(k) \quad (10)$$

where $$r_e(k) = [r(k+Q-1)r(k+Q-2) \ldots r(k)]^T \quad (11)$$

$$H = \begin{bmatrix} H(0) & H(1) & \cdots & H(Q-1) & & 0 \\ & H(0) & H(1) & \cdots & H(Q-1) & \\ & & \ddots & & & \\ 0 & & & H(0) & H(1) & \cdots & H(Q-1) \end{bmatrix} \quad (12)$$

In this case, however, the estimated value $r'_{s,n}(k)$ still contains interference components left uncanceled due to a bit decision error in the previous iteration and the usage of the soft output value.

Next, the cancellation of interference components still remaining after the cancellation of the received interference signal replica from the received signal and multi-paths combining are carried out by the MMSE filtering part 32$_n$. Since in the early iterations many interference components remain uncancelled after the subtraction of the interference replica, the MMSE filtering part 32$_n$ functions as a filter which cancels the remaining interference components, and with an increase in the number of iterations, the MMSE filtering part 32$_n$ operates to perform maximum-ratio combining of multi-paths. Letting the output from the MMSE filtering part 32$_n$ be represented by $z_n(k)$, it is given as follows:

$$z_n(k) = w_n^H(k)r_{s,n}(k) \quad (13)$$

where $^H$ denotes a conjugate transposed matrix and $w_n(k)$ is a coefficient vector of the MMSE filtering part $32_n$, which is defined as follows in the filter coefficient calculating part $33_n$.

$$w_n(k)=[H\Lambda_n(k)H^H+\sigma^2 I]^{-1}h_n \quad (14)$$

where I is a unit matrix, $h_n$ is $$h_n = [h_{1n}(Q-1)h_{2n}(Q-1)\ldots h_{Mn}(Q-1) \quad (15)$$
$$h_{1n}(Q-2)h_{2n}(Q-2)\ldots h_{Mn}(Q-2)$$
$$\ldots$$
$$h_{1n}(0)h_{2n}(0)\ldots h_{Mn}(0)]^T$$

And, setting $D(k)$ and $D_c(k)$ to $$D(k)=[1-s'^2_1(k)1-s'^2_2(k)\ldots 1-s'^2_N(k)] \quad (16)$$

$$D_{cn}(k)=[1-s'^2_1(k)1-s'^2_2(k)\ldots 1-s'^2_{n-1}(k)1\ 1-s'^2_{n+1}(k)\ldots 1-s'^2_N(k)] \quad (17)$$

$\Lambda_n(k)$ is expressed as follows:

$$\Lambda_n(k)=\text{diag}[D(k+(Q-1))D(k+(Q-2))\ldots D(k+1)D_{cn}(k)D(k-1)\ldots D(k-(Q-1))] \quad (18)$$

where $\sigma^2$ represents the internal noise power of the receiver and diag a diagonal matrix (elements other than those of the diagonal are zeros).

With the prior art described above, symbols sent simultaneously from a plurality of user transmitters at the same frequency can be received by a plurality of antennas and separated for each user.

There is proposed, for example, in Japanese Patent Application Laid-Open Gazette 2002-33685 an interference canceller for use in the CDMA (Code Division Multiple Access) mobile communication system. To cancel interference for signals from a plurality of users, the proposed interference canceller provisionally decides a signal after error correction encoding and uses the provisionally decided value to generate a replica and, at this time, prevents occurrence of many errors attributable to the generation of a wrong replica when the above-mentioned provisionally decided value is wrong. This interference canceller will be described below with reference to FIG. 7 which is arranged for 3 users and 4 stages.

In a first stage 301 interference canceling parts (ICU) 311 to 313 each perform the processing shown in FIG. 8. In the first place, a RAKE receiving part 401 performs RAKE reception of a user signal. That is, for each path the user signal is despread in a despreading part 404, and the despread signal is provided to a channel estimation part 405 and a multiplication part 406. A channel estimated value derived from the despread signal in the channel estimation part 405 and the despread signal are multiplied in the multiplication part 406. Such multiplied outputs in the respective paths are added together in an adding part 407, and the result of RAKE reception, which is the result of the addition, is provided to an FEC (Forward Error Correction) decoding part 408 and a pre-FEC-decoding hard decision part 411 in a transmission data decision part 402.

The pre-FEC-decoding hard decision part 411 makes a hard decision directly based on the result of RAKE reception, and the FEC decoding part 408 performs FEC (Forward Error Correction) decoding based on the result of RAKE reception. The EFC decoded signal is subjected to hard decision in a hard decision part 409, thereafter being applied to an FEC encoding part 410 and an error detecting part 421. The FEC encoding part 410 performs FEC encoding of the hard decision signal, and outputs the FEC-encoded hard decision value to a switch 423 and the corresponding ICU parts 321 to 323 in a second stage 302.

An error detecting part 421 performs an error detection by CRC (Cyclic Redundancy Check), and applies the detected output to a switch control part 422 and the corresponding ICU parts 321 to 323 in the second stage 302.

The switch control part 422 controls the switch 423 according to the CRC output. When the CRC result is NG (error detected), the switch control part 422 controls the switch 423 to apply therethrough the yet-to-be-FEC-decoded hard decision value from the pre-FEC-decoding hard decision part 411 to a multiplying part 414 of each path in a replica generating part 403. The multiplying part 414 of each path in the replica generating part 403 multiplies the yet-to-be-FEC-decoded hard decision value and a channel estimated value of the corresponding path which is fed from the RAKE receiving part 401, and the multiplied output is provided to a re-spreading part 415, wherein it is spread in the same manner as at the transmitting side. The spread signals of the respective paths are added together in an adding part 416, and the added output is provided as a replica from each of the ICU parts 311 to 313, thereafter being applied to a second stage 302 via each of adding parts 315 to 317 in the first stage in FIG. 7.

When the CRC result is OK (no error detected), the switch control part 422 controls the switch 423 to apply therethrough the FEC-decoded hard decision signal (hard decision value) from the FEC ending part 410 to the multiplying part 414 of each path in the replica generating part 403.

Replicas of respective received signals from the ICU parts 311, 312 and 313 are subtracted in a subtracting part 314 from the received signal fed thereto via a delay part 310, and the subtracted received signal is added with replicas from the ICU parts 311, 312 and 313 in adding parts 315, 316 and 317, respectively. Accordingly, the output from the adding part 315, for instance, is equivalent to a signal obtainable by cancelling components of other user's received signals from the received signal. Similarly, the adding part 316 and 317 output the corresponding received signals from which other interference signals have been removed, respectively.

In the ICU parts 321 to 323 in the second stage 302, the RAKE receiving part 401 and the transmission data decision part 402 perform the same processing as in the case of the first stage 301 as shown in FIG. 9 in which the parts are denoted by reference numerals similar to those of the corresponding parts in FIG. 8. To the error detecting part 421a are input the hard decision signal from the hard decision part 409 in the current stage (the second stage 302) and the CRC result provided from the previous stage (the first stage 301). To the switch part 423a are input a yet-to-be-decoded hard decision value and an FEC-decoded hard decision value in the current stage and the hard decision value provided from the previous stage. The current-stage error detected result (CRC result) in the error detecting part 421a and the hard decision value from the FEC encoding part 410 are output to each of the corresponding ICU parts 331 to 333 of the next stage (third stage 303). The switch control part 422a selects its output signal to the replica generating part 403 according to the following three conditions. First, when the CRC result from the previous stage is OK (no error detected), the hard decision value of the previous stage is provided to the replica generating part 403. Second, when the CRC result from the previous stage is NG (error detected) and the CRC result on the hard decision signal in the current stage is OK, the hard decision value from the FEC encoding part 410 is selected and provided to the replica generating part 403. Third, when the CRC result from the previous stage is NG and the CRC result on the hard decision signal in the current stage is also NG, the hard decision value from the pre-FEC-decoding hard decision part 411 is selected and provided to the replica generating part 403.

Accordingly, the second stage 302 outputs each received signal having cancelled therefrom other received signals (interference signals). In the third stage 303, too, the same processing as in the second stage 302 is carried out. Turning to FIG. 10, the operation of each of the ICU parts 341 to 343 in the fourth stage 304 in FIG. 7 will be described below. The processing in the RAKE receiving part 401 is the same as in the case of the first stage 301. The output from the RAKE receiving part 401 is FEC decoded in the FEC decoding part 408 in a transmit data decision part 402*a*, and the FEC-decoded signal is subjected to hard decision in the hard decision part 409. A switch control part 422*b* controls a switch 423*b* to output therethrough, as a demodulated signal, the hard decision value of the previous stage or the hard decision signal from the hard decision part in the current stage, depending on whether the CRC result from the previous stage is OK (no error detected) or NG (error detect).

As described above, when the CRC result from the previous stage is OK, the error-free hard decision value of the previous stage is used to generate the replica—this ensures generation of an accurate replica. Besides, in this instance, a series of processes in the current stage, i.e. FEC decoding, hard decision and FEC encoding, become unnecessary, so that the computational complexity involved can be reduced. When the CRC result from the previous stage is NG and the CRC result in the current stage is OK, the error-free hard decision value in the current stage is used to generate the replica; hence, it is possible to obtain the replica with high accuracy. Further, when the CRC result from the previous stage is NG and the CRC result in the current stage is also NG, no wrong signal is used but a signal obtained by hard decision of a yet-to-be-FEC-decoded in the current stage is used to generate the replica—this excludes the possibility of a wrong replica by use of a wrong signal and provides for increased accuracy of replica.

Incidentally, in FIGS. 8 and 9, a soft-decision result of the output from the RAKE receiving part 401 may be used instead of the output from the pre-FEC decoding hard decision part 411.

SUMMARY OF THE INVENTION

It is therefore an object of the present invention to provide an adaptive equalizing apparatus which permits reduction of the computational complexity for MMSE filter coefficients and suppresses degradation of the bit error rate, and a program therefor.

The adaptive equalizing apparatus according to the present invention comprises:

interference canceling means supplied with a received signal a channel estimation value and an a priori information stream, for canceling an interference component in said received signal;

a filter part supplied with said interference-cancelled received signal, for suppressing interference and for combining multi-path components;

an interference-cancellation-degree estimation part supplied with information based on the state of iteration processing of said received signal, for estimating the degree of interference cancellation;

update timing generating means supplied with at least an iteration start signal, for generating filter coefficients update timing signal for each period during which the filter coefficients of said filter part are held unchanged; and filter coefficient calculating means supplied with the degree of interference cancellation, the channel estimation value and said update timing signal, for calculating the filter coefficients of said filter part upon each generation of said update timing signal.

DETAILED DESCRIPTION OF THE PREFERRED EMBODIMENT

A description will be given first of how the present invention was made.

Figure 5:
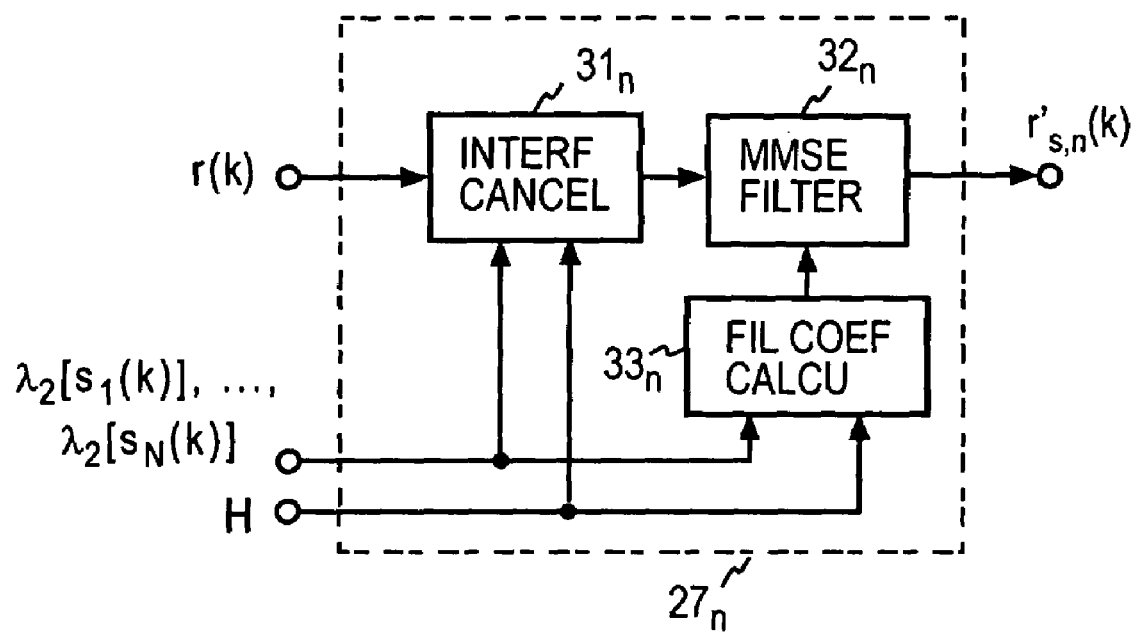
FIG. 5 is a block diagram depicting the functional configuration of an adaptive equalization part 27 in FIG. 4.
Figure 6:
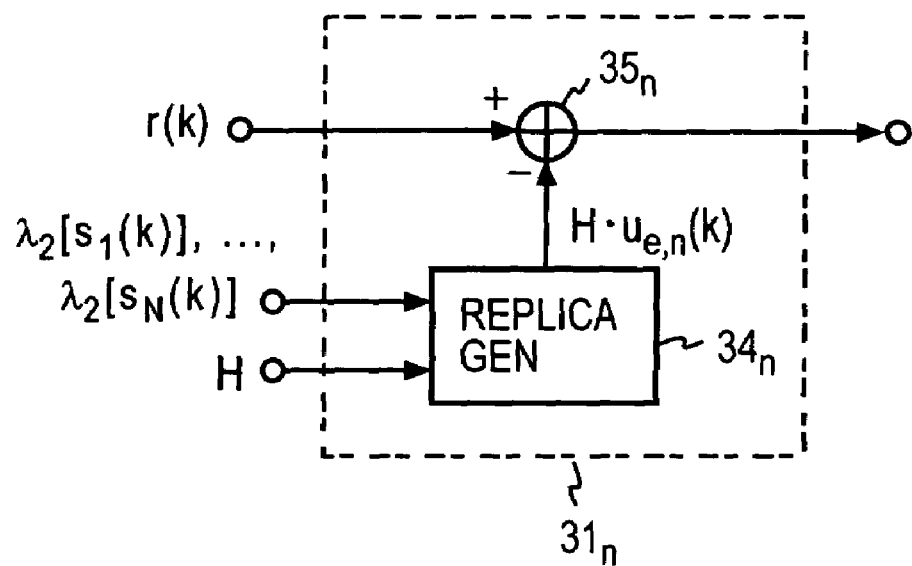
FIG. 6 is a block diagram depicting the functional configuration of interference canceling means 31 in FIG. 5.
Figure 7:
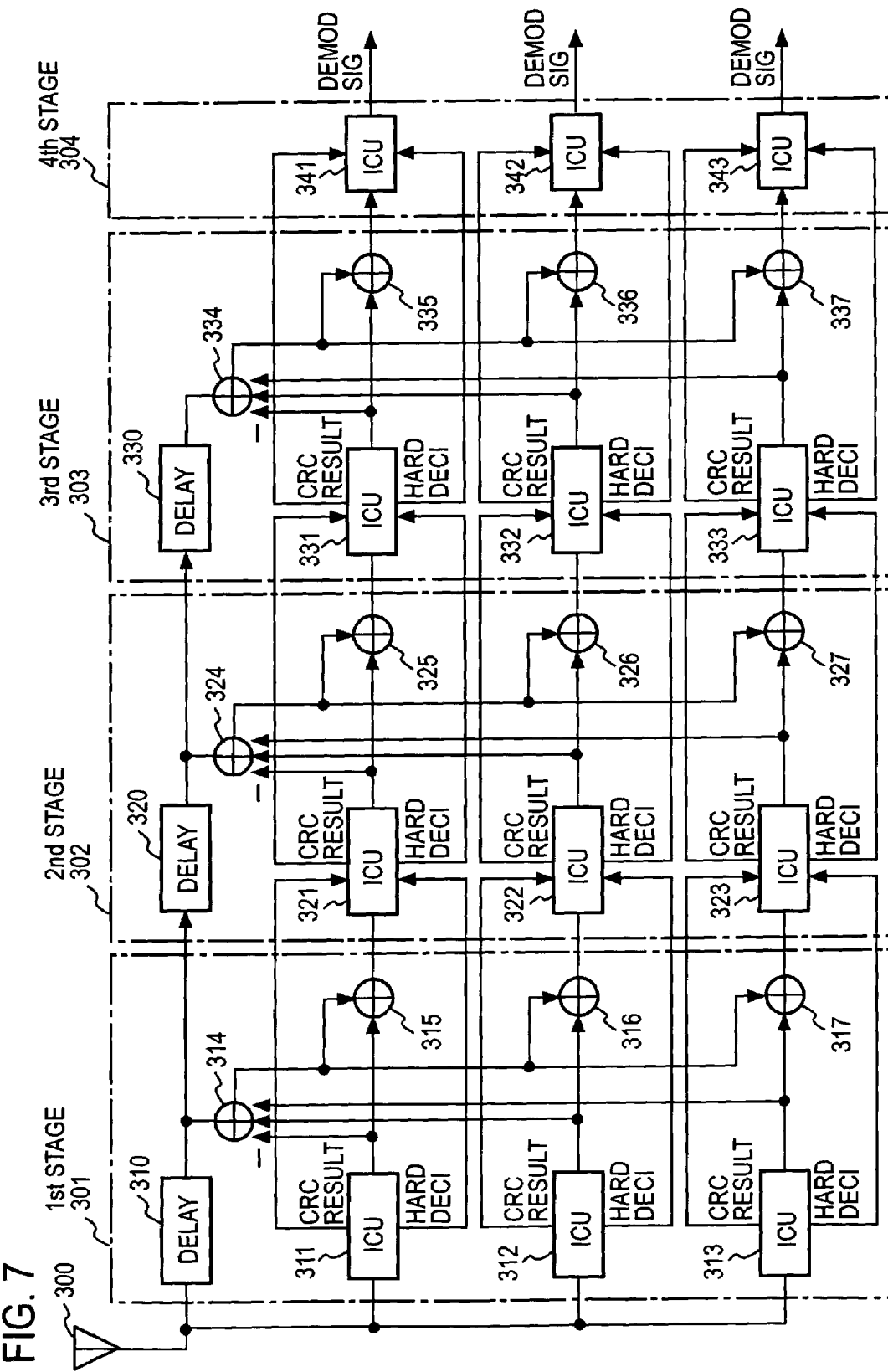
FIG. 7 is a block diagram showing the functional configuration of a conventional interference canceller.
Figure 8:
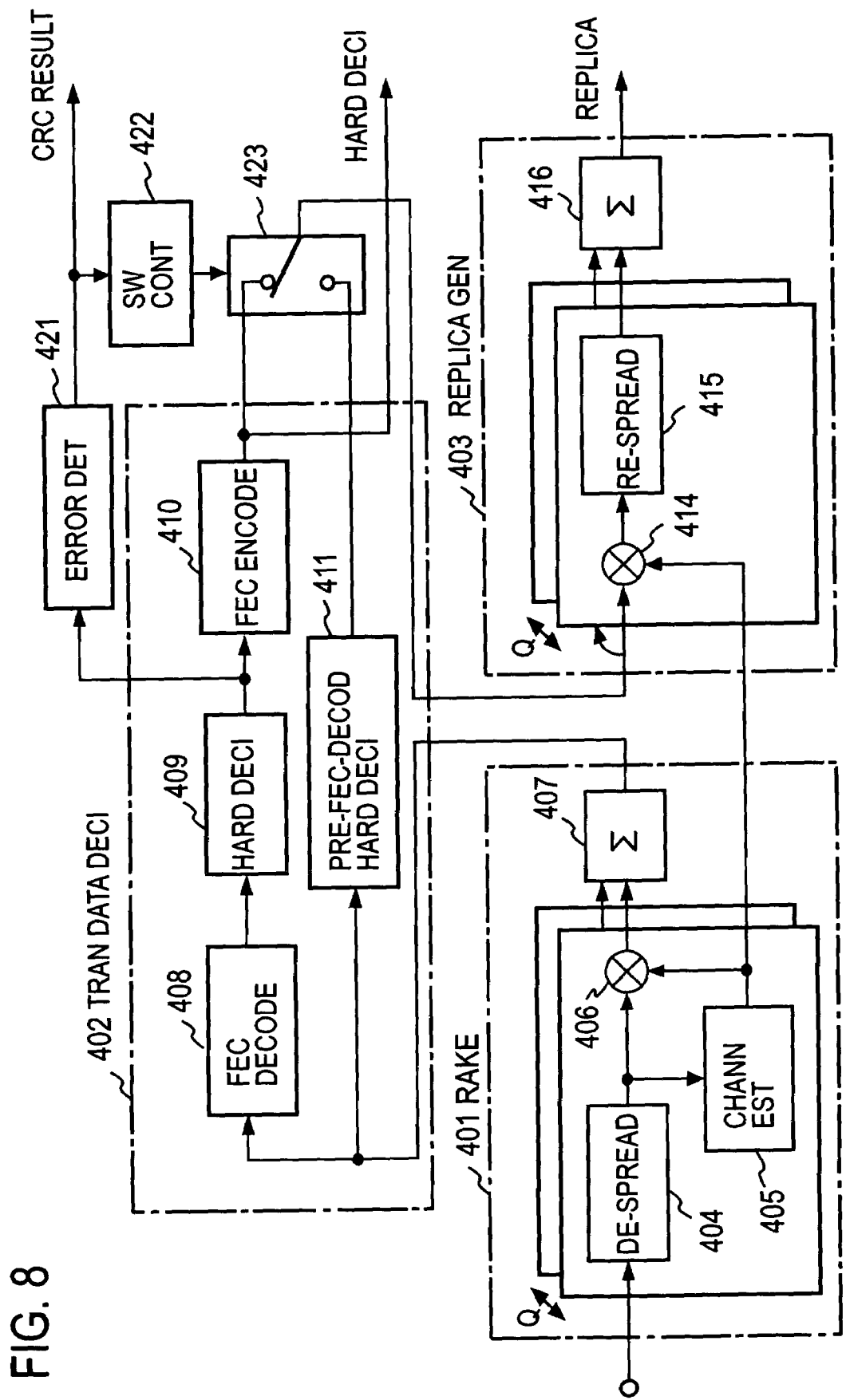
FIG. 8 is a block diagram showing the functional configuration of an ICU part of a first stage in FIG. 7.
Figure 9:
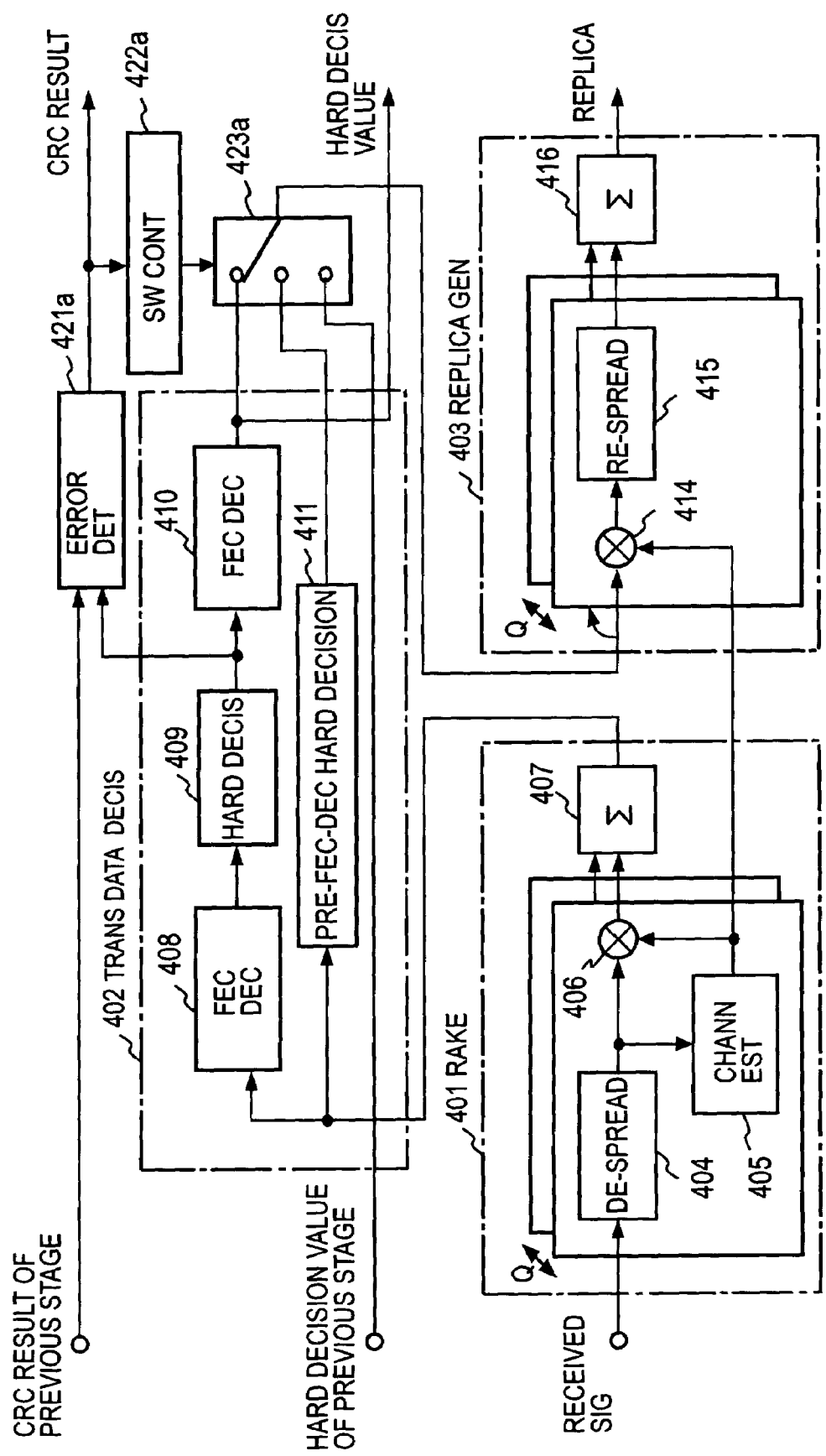
FIG. 9 is a block diagram showing the functional configuration of an ICU part of a second stage in FIG. 7.
Figure 10:
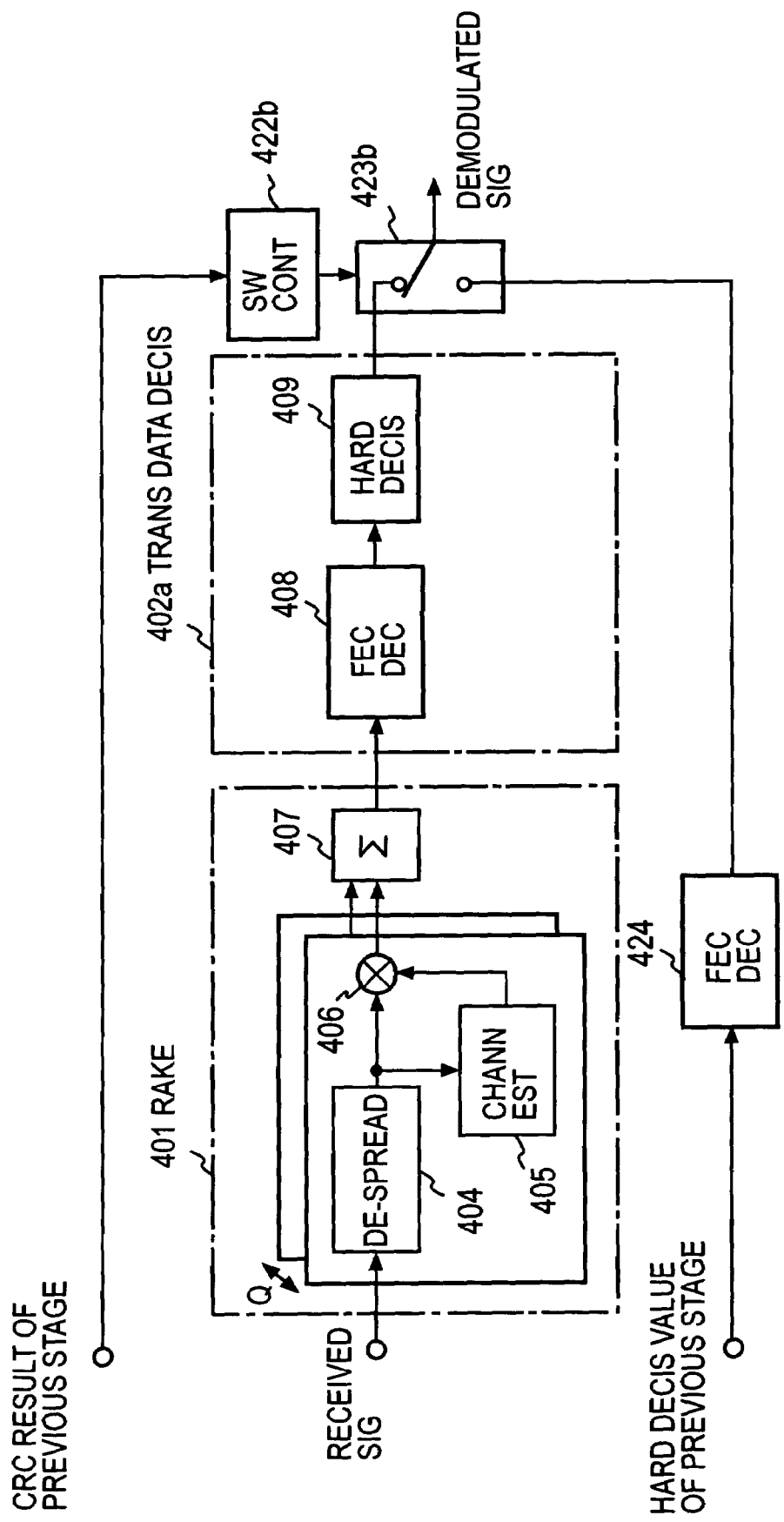
FIG. 10 is a block diagram showing the functional configuration of an ICU part of a fourth stage in FIG. 7.

In the first iteration processing of the received signal the updating of MMSE filter coefficients in the filter coefficient calculating part $33_n$ in FIG. 5 needs only to be performed once at the beginning of the frame since no second external information value $\lambda_2[s_n(k)]$ is available in the first iteration, but in the second and subsequent iterations the filter coefficients need to be updated for each symbol because the second external information value $\lambda_2[s_n(k)]$ usually differs from symbol to symbol.

Figure 4:
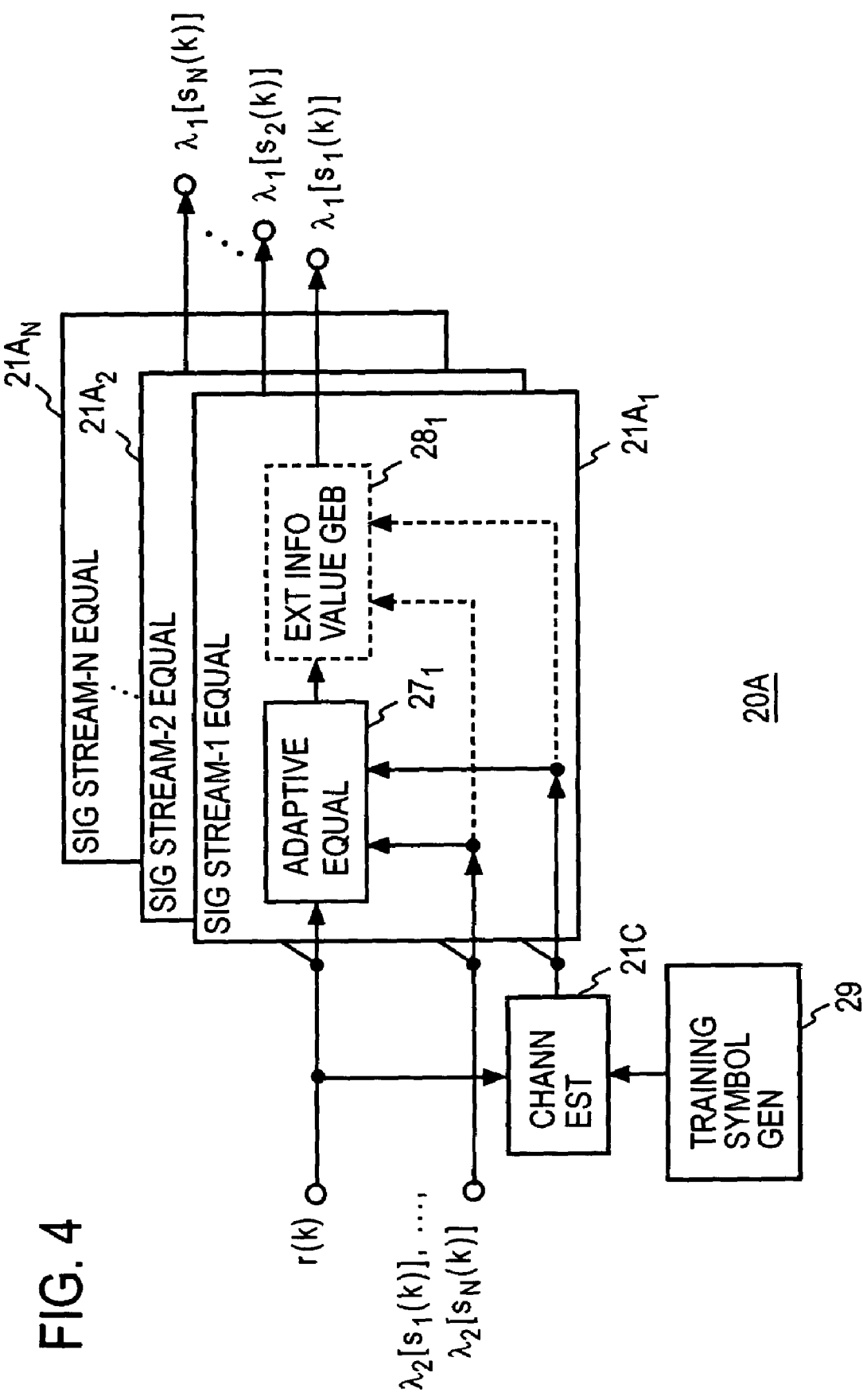
FIG. 4 is a block diagram depicting the functional configuration of a MIMO equalizer 20A in FIG. 3.

Incidentally, the first external information value $\lambda_1[s_1(k)]$ for the symbol $s_1(k)$ is calculated by the following equation in the broken-lined external information value generating part $28_1$ in FIG. 4

$$\lambda_1[s_1(k)] = 4R\{z_n(k)\}/(1-\mu_n(k)) \quad (19)$$

where $R\{z_n(k)\}$ represents a real part of $z_n(k)$ and $u_n(k)$ is $$\mu_n(k) = h_n^H [H\Lambda_n(k)H^H + \sigma^2 I]^{-1} h_n \quad (20)$$

Figure 11:
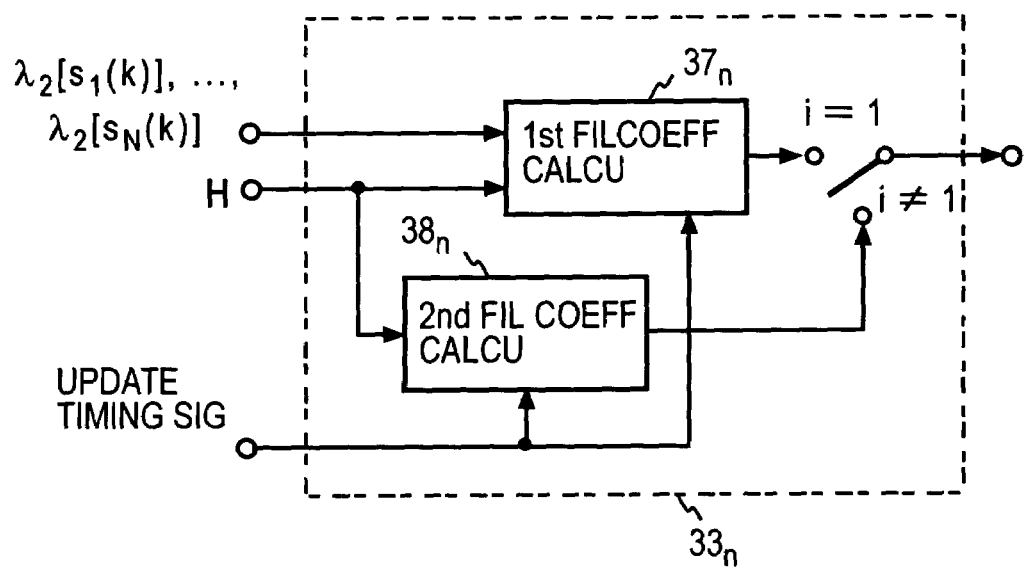
FIG. 11 is a block diagram showing the functional configuration of a filter coefficient calculating part 33 in FIG. 5 which could be used in the case of applying MRC approximation.

Since the MMSE filter coefficients are calculated by Eqs. (14) to (18), the computational complexity involved is high. Then, consider the application of the approximation scheme set forth in the afore-mentioned H. Ohmori, et. al. document to the conventional adaptive equalizer described previously with reference to FIGS. 3 to 6. FIG. 11 shows the configuration of the filter coefficient calculating part $33_3$ (FIG. 5) considered to be usable for implementation of the approximation scheme. In the first iteration, the MMSE filter coefficients are calculated in a first filter calculating part $37_n$ as described previously. In the first iteration, however, since there is no feedback of the second a priori information $\lambda_2[s(k)]$ from the signal stream-n decoding part $20B_n$ (FIG. 3), soft decision symbol estimated value (hereinafter referred to as a soft decision value) $s'_n(k)=0$ in all k's; therefore, the MMSE filter coefficients need not be calculated for each symbol, and they can be made common in each frame. In the second and subsequent equalizations, since $s'_n(k)=1$ is set by the approximation, it follows that $\Lambda_n(k)=1$. Hence, the filter coefficient vector $w_n(k)$ is the product of a constant Const. and a channel estimation value $h_n$ (Eq. 15).

$$w_n(k) = \text{Const.} \, h_n \quad (21)$$

This is calculated in a second filter coefficient calculating part $38_n$ (FIG. 11). That is, in the case of this approximation, the multi-path components are maximum-ratio combined and weighted by a scalar value. This approximation extremely simplifies the filter coefficient calculation. This approximation will hereinafter be referred to as an MRC approximation.

In the case of using the MMSE filter in the equalization process of the MIMO system, since transmit signal replicas of ISI and MAI symbols differ for each symbol, the MMSE filter coefficients need to be calculated for each symbol, which requires an enormous amount of calculations. To avoid this, if the above-mentioned MRC approximation which sets $s'_n(k)=1$ is applied to the second and subsequent MMSE filter coefficient calculations, the computational complexity can be dramatically reduced since the MMSE filter coefficients need only to be calculated once for each frame, but the interference canceling effect diminishes as compared with that in the case of calculating the MMSE filter coefficients for each symbol, resulting in BER (Bit Error Rate) becoming badly degraded.

In the view of the above, according to the present invention, the degree of interference cancellation is obtained from information based on the iteration processing state for the received signal, and the degree of interference cancellation is used in place of the soft decision value $s'_n(k)$ to calculate the MMSE filter coefficients, which are set in the MMSE filter. The higher the degree of interference cancellation is, the closer to 1 its value is set. Accordingly, computational complexity can be reduced by maintaining filter coefficients unchanged in one iteration process, and further, since the degree of interference cancellation approaches 1 as the iteration proceeds to cancel the interference, it is possible to suppress the BER (Bit Error Rate) degradation.

The above configuration heightens the interference canceling effect as compared with that by the application of the conventional MRC approximation. This seems to be due to the fact that although when the MRC approximation is not used, $s'_n(k)=1$ means very high reliability of the result of SISO decoding, $s'_n(k)$ contains errors in practice; for instance, the result of second or third SISO decoding also contains relatively many errors.

Embodiment 1

Figure 12:
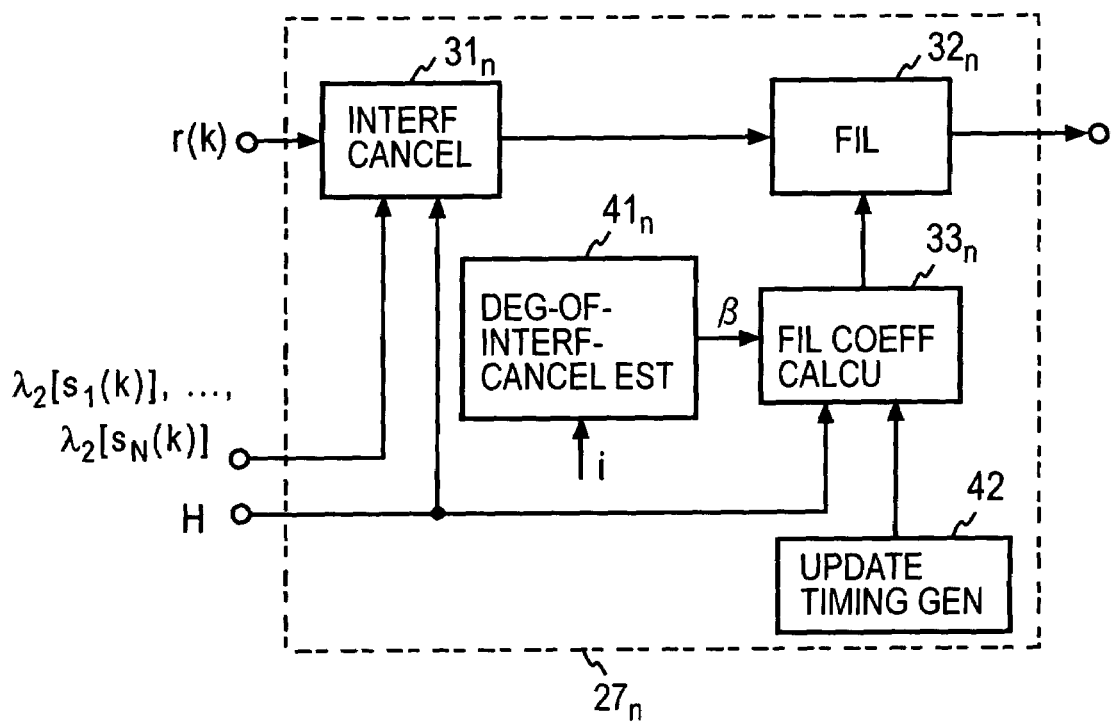
FIG. 12 is a block diagram illustrating the functional configuration of the principal part of a first embodiment of the present invention.

In FIG. 12 the adaptive equalizer according to the present invention is shown in correspondence to the adaptive equalization part $27_n$ in FIG. 5. The adaptive equalizer according to the present invention is provided with a degree-of-interference-cancellation estimation part $41_n$ and an update timing generating part 42 in addition to the interference canceling means $31_n$, the filter part $32_n$ and the filter coefficient calculating part $33_n$ in FIG. 5. In the present invention, the degree of interference cancellation β is calculated in the degree-of-interference-cancellation calculating part $41_n$, and is used to calculate the filter coefficients in the filter coefficient calculating part $33_n$. More specifically, the filter coefficients are calculated by setting $s'_n(k)$ (where n=1, . . . , N) in Eqs. (16) and (17) to β. From the viewpoint of reducing the computational complexity, β may preferably be constant in the frame. At this time, Eqs. (16) and (17) become as follows:

$$D(k) = [1-\beta^2 \; 1-\beta^2 \; \ldots \; 1-\beta^2] \quad (22)$$

$$D_{cn}(k) = [1-\beta^2 \; \ldots \; 1-\beta^2 \; 1-\beta \ldots \; 1-\beta^2] \quad (\leq)$$

Figure 13:
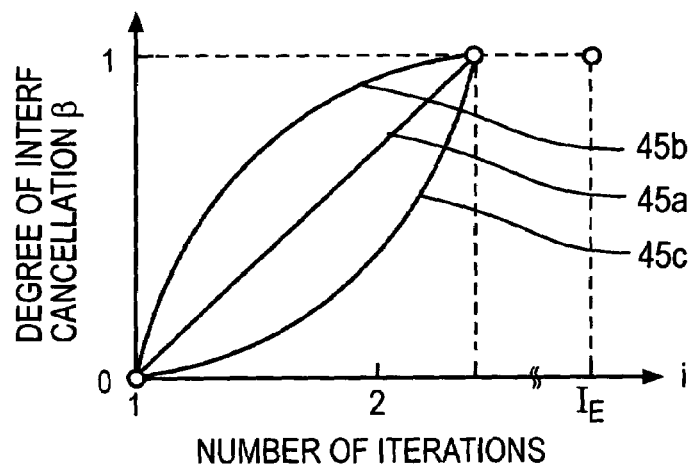
FIG. 13 is a graph showing, by way of example, the relationship between the number of iterations and the degree of interference cancellation.

In this instance, the degree of interference cancellation β is 0 for i=1 because of the property of the soft decision value $s'_n(k)$, and increases with an increase in the number of iteration processes for the received signal (referred to also as the iteration number), and it is desirable that β goes to 1 until the final iteration at the latest if the iteration number is sufficient. The degree of interference cancellation β that meets such conditions are considered infinite, but it can be set as a function of the iteration number i, for instance. FIG. 13 shows examples of a degree-of-interference-cancellation function β(i). In FIG. 13 the curves 45a, 45b and 45c indicate β(i) in the form of linear, 1/m-degree and m-degree expressions of i, respectively.

In practice, it is desirable to set β(i) to a value close to the 1/m-degree expression of i such that β is 0 for i=1, then, for i=2, abruptly increases to a value close to 1, for example, 0.8 or so, thereafter gradually approaching 1, for example, increasing about 0.05 for each iteration, for instance. Further, it is set that β=1 prior to the last iteration and β=1 in the subsequent iterations. To this end, the degree-of-interference-cancellation function β(i) can be set as follows, for instance:

$\beta(i)=0$ for $i=1$ $\beta(i)=0.8+0.05\times(i-1)$ for $5\geq i\geq 2$ $\beta(i)=1$ for $i\geq 6$ (24)

Preferable values of the constant 0.8 and the coefficient 0.05 in the linear expression using the i as a variable change with the scheme used. For example, in OFDM (Orthogonal Frequency Division Multiplex), the constant may preferably be around 0.9.

The iteration number i is input to the degree-of-interference-cancellation estimation part $41_n$ to obtain the degree of interference cancellation β(i), and each time an update timing signal is applied to the filter coefficient calculating part $33_n$ from the update timing generating part 42, the degree of interference cancellation β(i) at that time is used to calculate the filter coefficients by Eqs. (14), (15), (18), (22) and (23), and the filter coefficients of the filter part $32_n$ are updated with the calculated filter coefficients. The degree-of-interference-cancellation estimation part $41_n$ is provided in common to the filter coefficient calculating parts $33_n$ corresponding to respective users.

As will be understood from the description given of the next second embodiment, according to this embodiment, at the beginning of the period during which filter coefficients are held unchanged, in this case, prior to the processing of the data symbol in each iteration, the update timing signal is generated in the update timing generating part 42, then the degree of interference cancellation β(i) is calculated and is used to calculate the filter coefficients, which are set in the filter part $32_n$, then when β(i) becomes 1, the filter coefficients at that time are held unchanged until the last iteration $I_E$.

Embodiment 2

Figure 14:
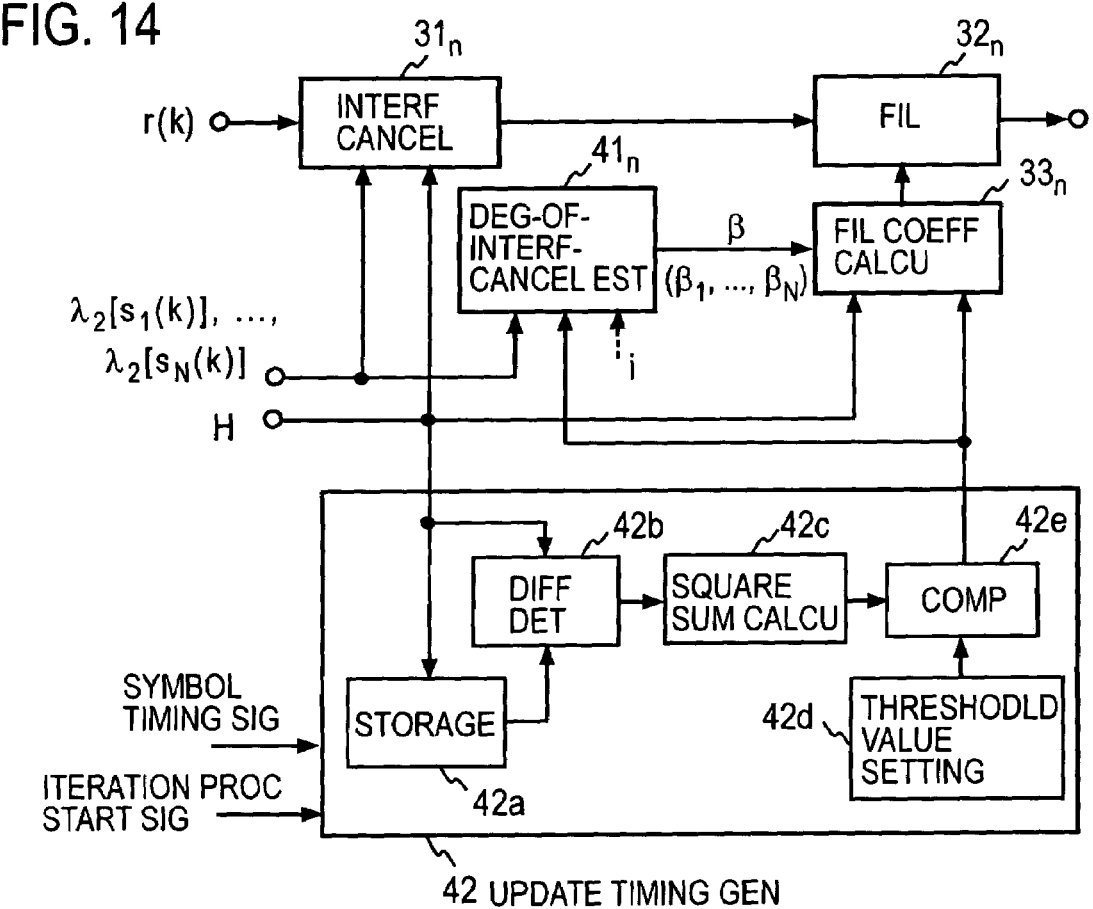
FIG. 14 is a block diagram illustrating the functional configuration of the principal part of the second embodiment of the present invention.

FIG. 14 illustrates in block form the principal part of the second embodiment of the invention. In the first embodiment the degree of interference cancellation β is set as a function of the iteration number i alone, but in the second embodiment the degree of interference cancellation β is set as a function of a second a priori information value $\lambda_2[s(k)]$. For example, the mean value of the soft decision value $s'_n(k)=\tanh\lambda_2[s_n(k)/2]$ in the period during which the filter coefficients are kept unchanged is used as the degree of interference cancellation as follows:

$$\beta = (1/N)(1/N_{sy})\sum_{n=1}^{N}\sum_{k=1}^{N_{sy}} s'_n(k)$$ (25)

where N is the number of users and $N_{sy}$ is the number of symbols contained in the period during which the filter coefficients remain unchanged. Here, the period during which the filter coefficients are kept unchanged can be judged from the filter coefficient update timing signal as well. That is, the one-frame (burst) period of the received signal usually consists of a training symbol period and a data symbol period succeeding it. In case where a channel estimation is made in the training data period, and the estimated value is used to perform the equalization process in the data symbol period, that is, to cancel interference by use of the interference replica in the interference canceling part $31_n$ and filtering in the filter part $32_n$, the coefficients are maintained unchanged during the entire data symbol period in that one process; accordingly, the soft decision value $s'_n(k)$ for every data symbol, the data symbol number $N_{sy}$ and the number of users in the immediately preceding iteration are used to calculate Eq. (25), then the degree of interference cancellation β thus obtained is used to calculate the filter coefficients by Eqs. (22) and (23) in the filter coefficient calculating part $33_n$, and the filter coefficients are set in the filter part $32_n$ in the current iteration. Hence, it is necessary only to output the filter coefficient update timing signal at the start of each iteration and calculate the filter coefficients once for each iteration. In short, at each filter coefficient update timing soft decision values obtained from the preceding filter coefficient update timing to the current one are averaged.

In the case where the channel estimation is performed by use of previously decoded data symbol even in the current data symbol processing, or where a training symbol is contained in the data symbol, a change in the channel state in excess of a certain value in one frame period is detected and the filter coefficient update timing signal is output. For example, as shown in FIG. 14, the channel estimation value H is input to the update timing generating part 42 at each symbol timing, and in a difference detecting part 42b the difference is detected between corresponding elements of the current channel estimation value H and that obtained immediately after the previous filter coefficient calculation and stored in a storage part 42a, and the square sum of the detected difference is calculated in a square sum calculating part 42b. The square sum is compared in a comparison part 42e with a threshold value set in a threshold value setting part 32d. When the square sum is larger than the threshold value, it is construed as indicating a change in the channel state, and the update timing signal is output and the stored content of the storage part 42a is updated with the channel estimation value input at that time. In response to the update timing signal the filter coefficient calculating part $33_n$ calculates the filter coefficients by use of the new channel estimation value H and updates the filter coefficients of the filter part $32_n$.

As described above, in the case of updating the filter coefficient in one frame period, too, Eq. (25) is calculated to estimate the degree of interference cancellation β by use of all the soft decision values $s'_n(k)$ obtained in the time interval between adjacent filter coefficient update timing signals (during the period wherein the filter coefficients are held unchanged) in the previous processing and the number $N_{sy}$ of the soft decision values, or by use of soft decision values $s'_n(k)$ obtained from the immediately preceding filter coefficient update timing to the current timing and the number $N_{sy}$ of them, and the estimated degree of interference cancellation β is used to calculate the filter coefficients, which are used to perform the filtering process in the filter part $32_n$ for the interference-cancelled signal in the period during which the filter coefficients remain unchanged). In this way, the filter coefficients are calculated only for each filter coefficient update timing signal, and the filter coefficients are held unchanged for tens of to hundreds of data symbols; hence, the computational complexity for the filter coefficients can be reduced accordingly. In this case, too, the degree of interference cancellation P may be a function using as its variable the value obtained by Eq. (25).

In the case of using these soft decision values $s'_n(k)$ to calculate Eq. (25), it is also possible to input the iteration number i to the degree-of-interference-cancellation estimating part $41_n$, as indicated by the broken line in FIG. 14, to multiply Eq. (25) by, for example, a function $\alpha(i)$ of i to provide the degree of interference cancellation $\beta(i)$. The function $\alpha(i)$ may also preferably be one that $\alpha(i)=0$ for i=1, then abruptly increases to a value close to 1 and gradually approaches 1, thereafter becoming saturated at 1.

Further, the calculation result of Eq. (25) need not always be used, but instead it may be used as a function of the degree of interference cancellation $\beta$. While the degree of interference cancellation by Eq. (25) is used in common to all user (transmit) signals, a different degree of interference cancellation may be used for each of the user signals (transmit signals from all of the transmitters) to be decoded. In this instance, the following equation is used.

$$\beta_n = (1/N_{sy}) \sum_{k=1}^{N_{sy}} s'_n(k) \quad (25')$$

$$D(k)=[1-\beta_1^2\ 1-\beta_2^2 \ldots 1-\beta_N^2] \quad (22')$$

$$D_{cn}(k)=[1-\beta_1^2\ 1-\beta_2^2 \ldots 1-\beta_{n-1}^2\ 1\ 1-\beta_{n+1}^2 \ldots 1-\beta_N^2] \quad (23')$$

Accordingly, the degree-of interference-cancellation estimation part $41_n$ is provided for each user signal (signal stream n) to be decoded, and the degrees of interference cancellation $\beta_1$ to $\beta_N$ for all the signal streams 1 to N are input to the respective filter coefficient calculating parts $33_n$.

The degree of interference cancellation may also be a function which directly uses the second a priori information $\lambda_2[s_n(k)]$ in place of the soft decision value $s'_n(k)$. Moreover, the degree of interference cancellation may be $\beta$ or $\beta_n$, or a function using either one of them as a variable; in short, it needs only to be function using the second a priori information $\lambda_2[s_n(k)]$.

The same applies to the embodiments of the invention described later on.

As will be seen from the above, the update timing generating part 42 is one that is supplied with the iteration start signal and the channel estimation value and generates the update timing signal upon each application thereto of the iteration start signal or upon each change of the channel estimation state in excess of a predetermined value, that is at the beginning of the period during which the filter coefficients are maintained unchanged.

Embodiment 3

Figure 15:
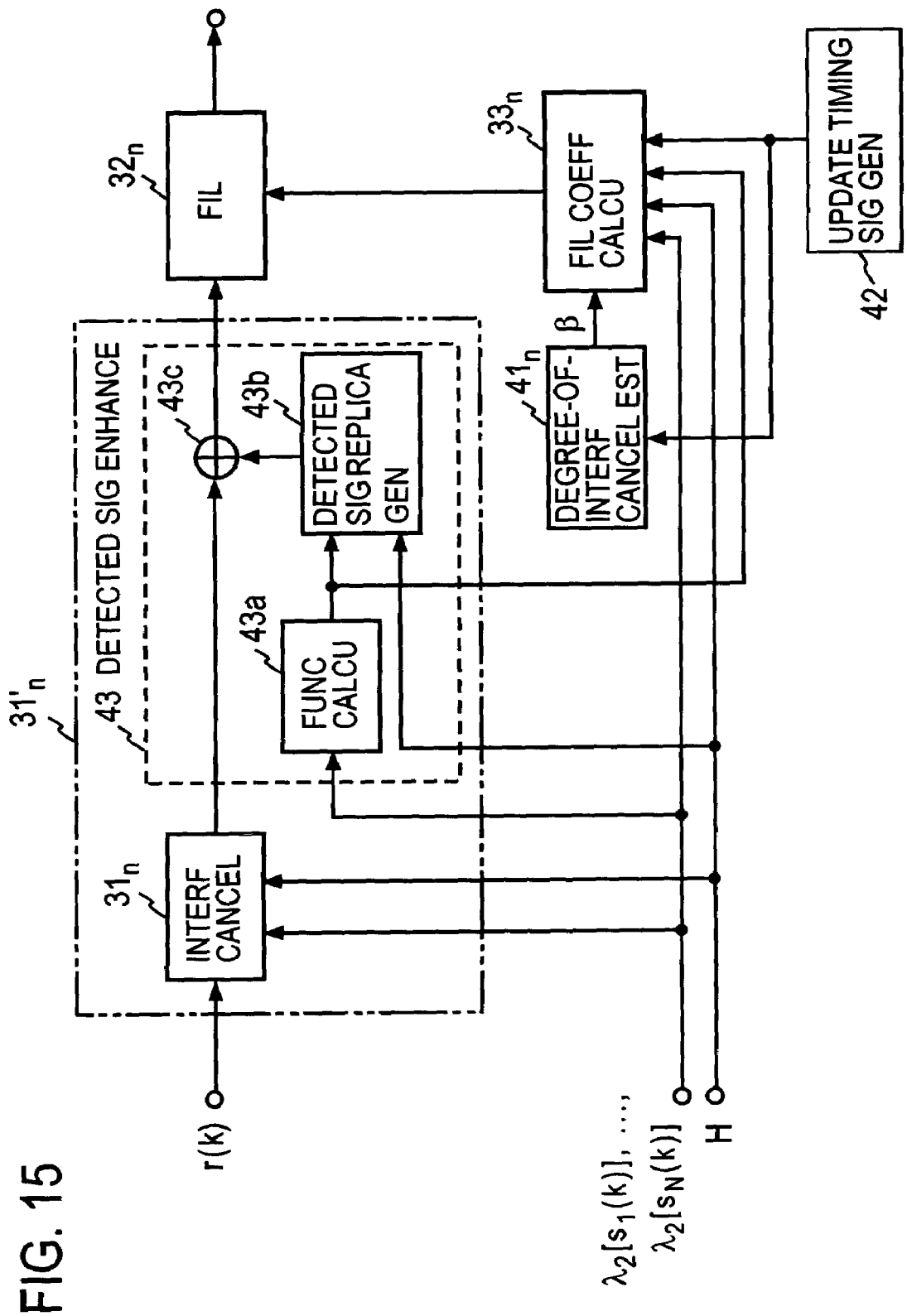
FIG. 15 is a block diagram illustrating the functional configuration of the principal part of a third embodiment of the present invention.

The equalization scheme of the first embodiment does not reflect the result of error correction encoding for the signal to be detected, but a scheme which reflects the error correction encoding result on the signal to be detected is set forth in European Patent Publication Gazette EP1233565A2. In view of this, this embodiment adds, as shown in FIG. 15, a function calculating part 43a, a detected signal replica generating part 43b and an adding part 43c to the adaptive equalizing apparatus of the FIG. 12 embodiment so that part of the received signal replica of the signal to be detected is added to the received signal. That is, by setting that element "0" in Eq. (9) corresponding to the signal to be detected to $-f(s'_n(k))$, the equation is changed as follows:

$$u_{cn}(k)=[s'_1(k+q)s'_2(k) \ldots s'_{n-1}(k)-f(s'_n(k))s'_{n+1}(k) \ldots s'_N(k)] \quad (26)$$

where $f(s'_n(k))$ is a function using $s'_n(k)$ as a variable.

As depicted in FIG. 15, the function calculating part 43a, the detected signal replica generating part 43b and the adding part 43b constitute a detected signal emphasizing part, and the detected signal emphasizing part 43 and the interference canceling part $31_n$ constitute interference canceling means $31'_n$. In interference canceling means $31'_n$ the interference component replica $Hu_{e,n}(k)$ is calculated by Eqs. (26) and (8) based on Eq. (7), and the interference component replica is cancelled from the received signal, and the resulting signal is applied to the filter part $32_n$. Since this process is intended to emphasize the signal to be detected, the detected signal emphasizing part 43 calculates $f(s'_n(k))$ is calculated in the function calculating part 43a of the detected signal emphasizing part 43 based on the second a priori information streams $\lambda_2[s_1(k)]$ to $\lambda_2(s_N(k))$ input thereto, and this calculated value $f(s'_n(k))$ and the channel estimation value H are used to generate a detected signal replica in the detected signal replica generating part 43b. That is, the detected signal replica generating part 43b obtains $u_{e,n}$ of Eq. (7) by setting all elements of $u_n(k)$ of Eq. (8) to 0s, the element 0 in $u_{e,n}$ of Eq. (9) to $f(s'_n(k))$ and the other elements to all 0s, and convolutes $u_{e,n}(k)$ of Eq. (7) and H to obtain the detected signal replica. The detected signal replica thus obtained is added to the received signal in the adding part 43c. While in FIG. 15 the detected signal replica is shown to be added to the output from the interference canceling part $31_n$, it may also be added to the input received signal to the interference canceling part $31_n$. Incidentally, as is evident from the following Eq. (27), the calculation result $f(s'_n(k))$ of the function calculating part 43a is also input to the filter coefficient calculating part $33_n$.

For emphasizing the signal to be detected, $D_{cn}(k)$ is defined by the following equation in place of Eq. (23) for calculating the MMSE filter coefficients.

$$D_{cn}(k)=[1-\beta^2 1-\beta^2 \ldots 1-\beta^2 1+2f(s'_n(k))s'_n(k)+|f(s'_n(k))|^2 1-\beta^2 \ldots 1-\beta^2] \quad (27)$$

The degree of interference cancellation $\beta$ may be that used in the first or second embodiment.

$F(s'_n(k))$ needs to satisfy the following condition since the sign of $s'_n(k)$ is related to the symbol hard decision result and since the larger the absolute value of $s'_n(k)$, the higher the reliability of the corresponding hard decision symbol.

When $s'_n(k)=0$, that is, when the reliability of the corresponding hard decision symbol is 0, the value of the function f is 0; namely $$f(0)=0 \quad (28)$$

When the value of $s'_n(k)$ is large, the value of the function f becomes large. Accordingly, $$d\{f(s'_n(k))\}/d\{s'_n(k)\} \geq 0 \quad (29)$$

Such a function may be defined, for example, by $$f(s'_n(k))=\gamma \times s'_n(k) \quad (30)$$

In this instance, setting $s'_n(k)=1$, Eq. (27) for calculating the MMSE filter coefficients becomes as follows:

$$D_{cn}(k)=[1-\beta^2 \ldots 1-\beta^2\ 1+2\gamma+\gamma^2 1-\beta^2 \ldots 1-\beta^2] \quad (27')$$

By using a constant for $\gamma$, the above equation can easily be implemented. Setting $\gamma$ to a large value, BER (Bit Error Ratio) becomes rather degraded; it is preferable that $0<\gamma<0.6$. The value of $\gamma$ may be increased in accordance with the iteration number.

Embodiment 4

In this embodiment, when no error is detected in the decoded bit stream in the signal stream-n equalizing part $21A_n$ for the user n (where n=1, . . . N), it is regarded that MAI (Multiple Access Interference) and ISI (Inter-Symbol Interference) have also been sufficiently cancelled, and the degree of interference cancellation $\beta_n$ is set to a predetermined constant. This provides for increased accuracy in the estimation of the degree of interference cancellation $\beta$ (or $\beta_n$).

Figure 1:
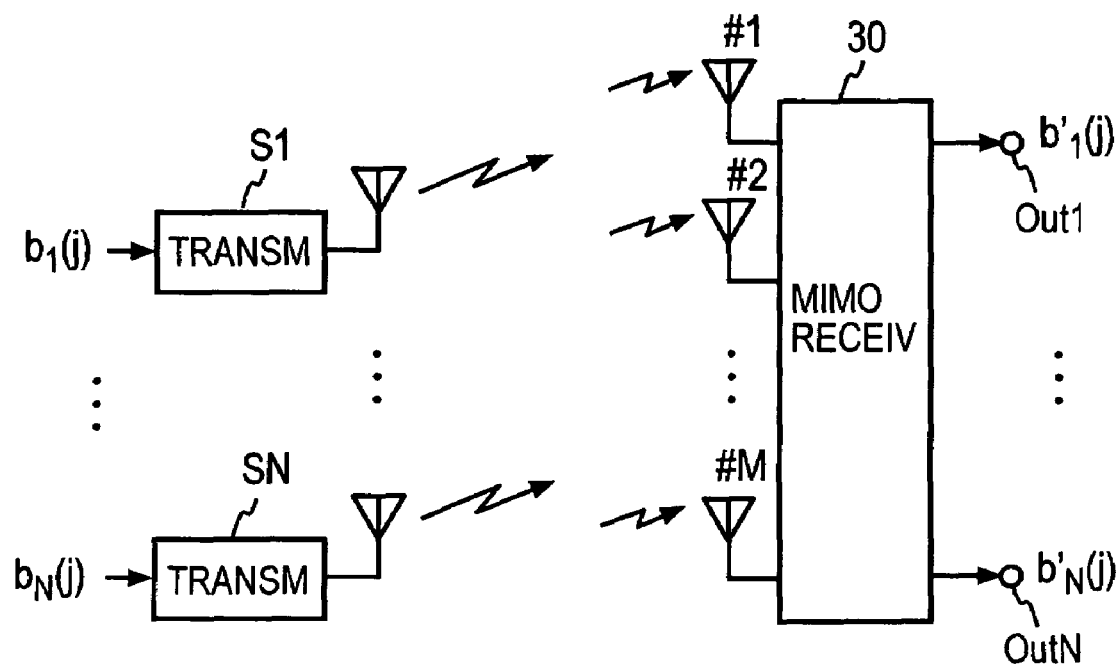
FIG. 1 is a schematic diagram of an MIMO system.
Figure 2:
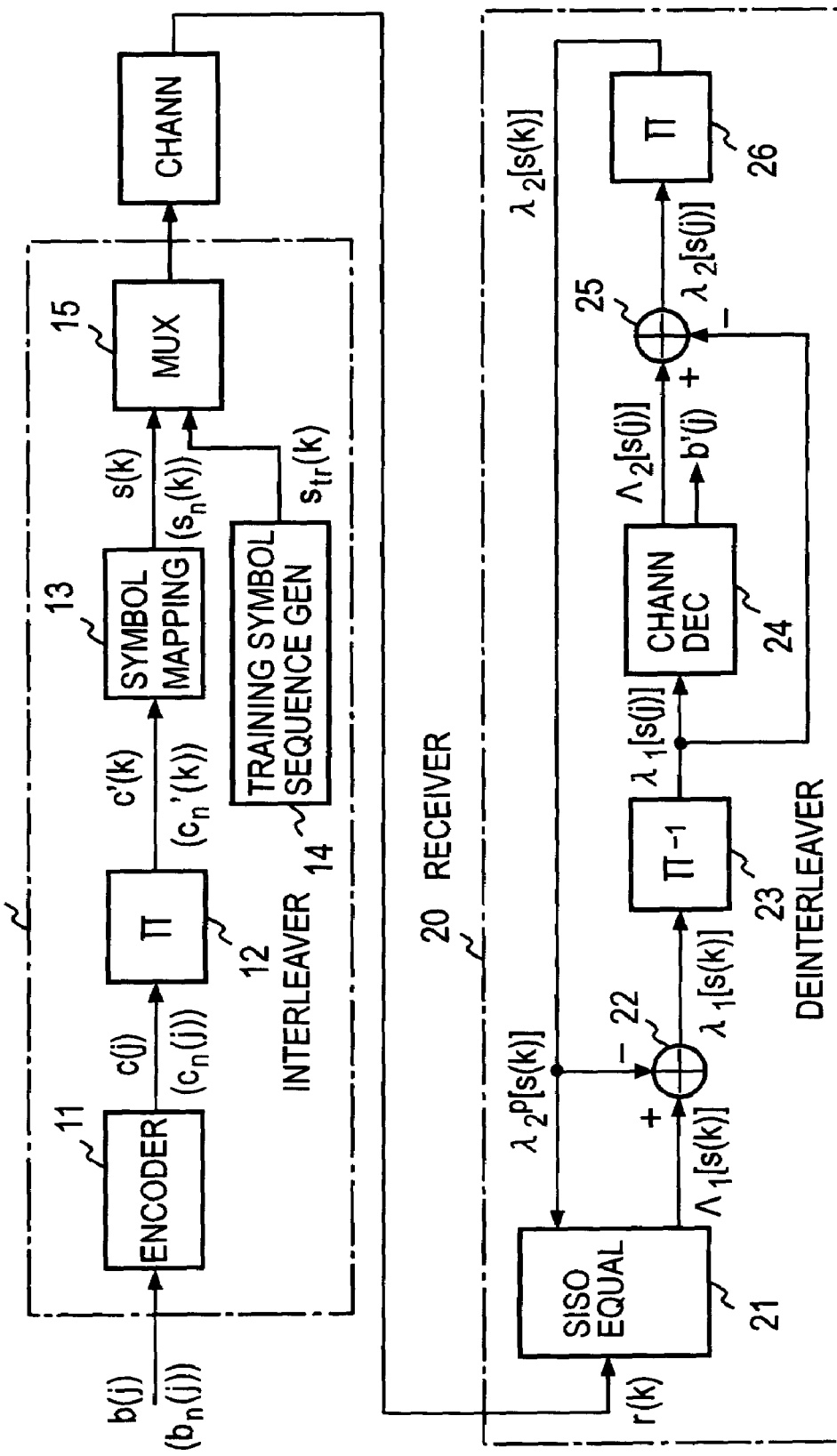
FIG. 2 is a block diagram depicting functional configurations of a transmitter and a receiver in a conventional single user turbo system.
Figure 3:
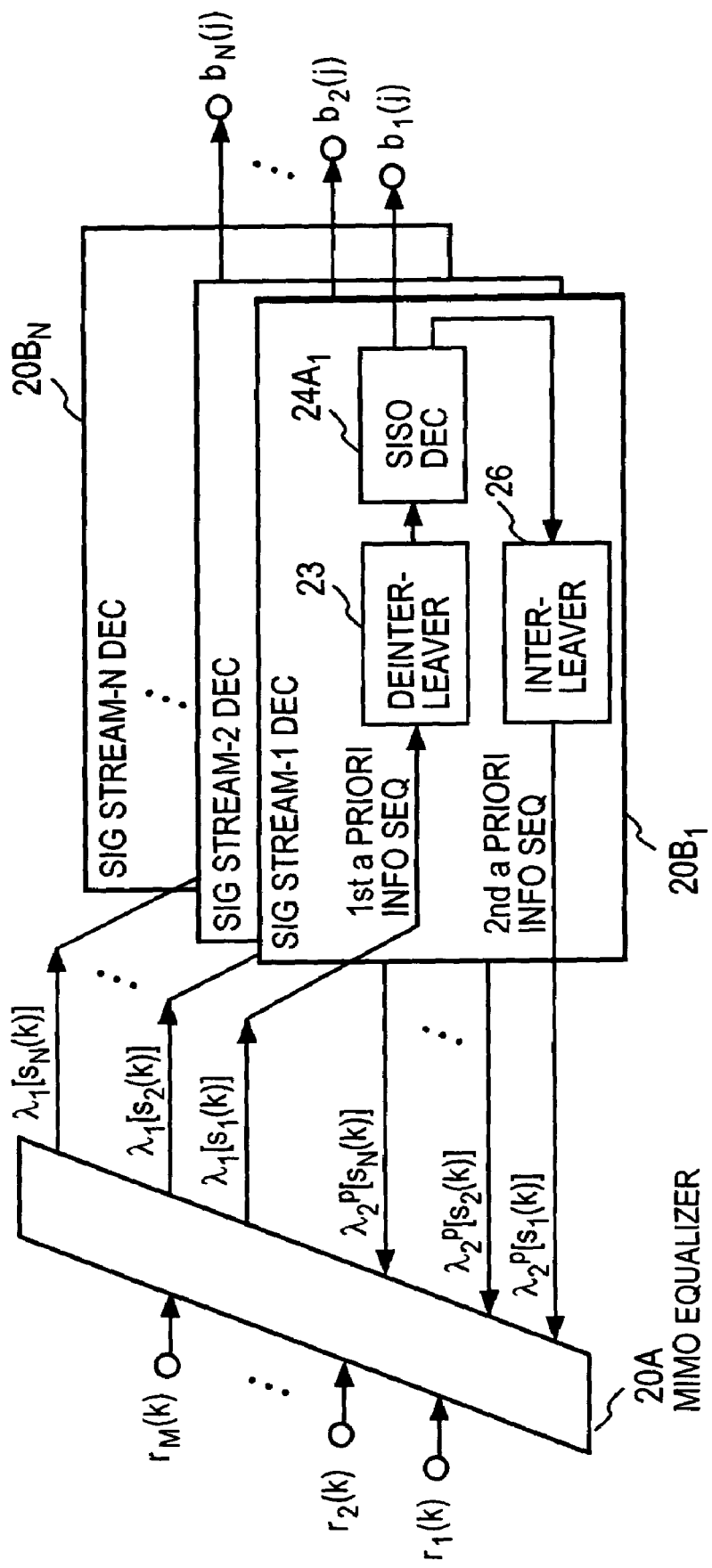
FIG. 3 is a block diagram depicting the functional configuration of the principal part of a conventional MIMO turbo receiver.
Figure 16:
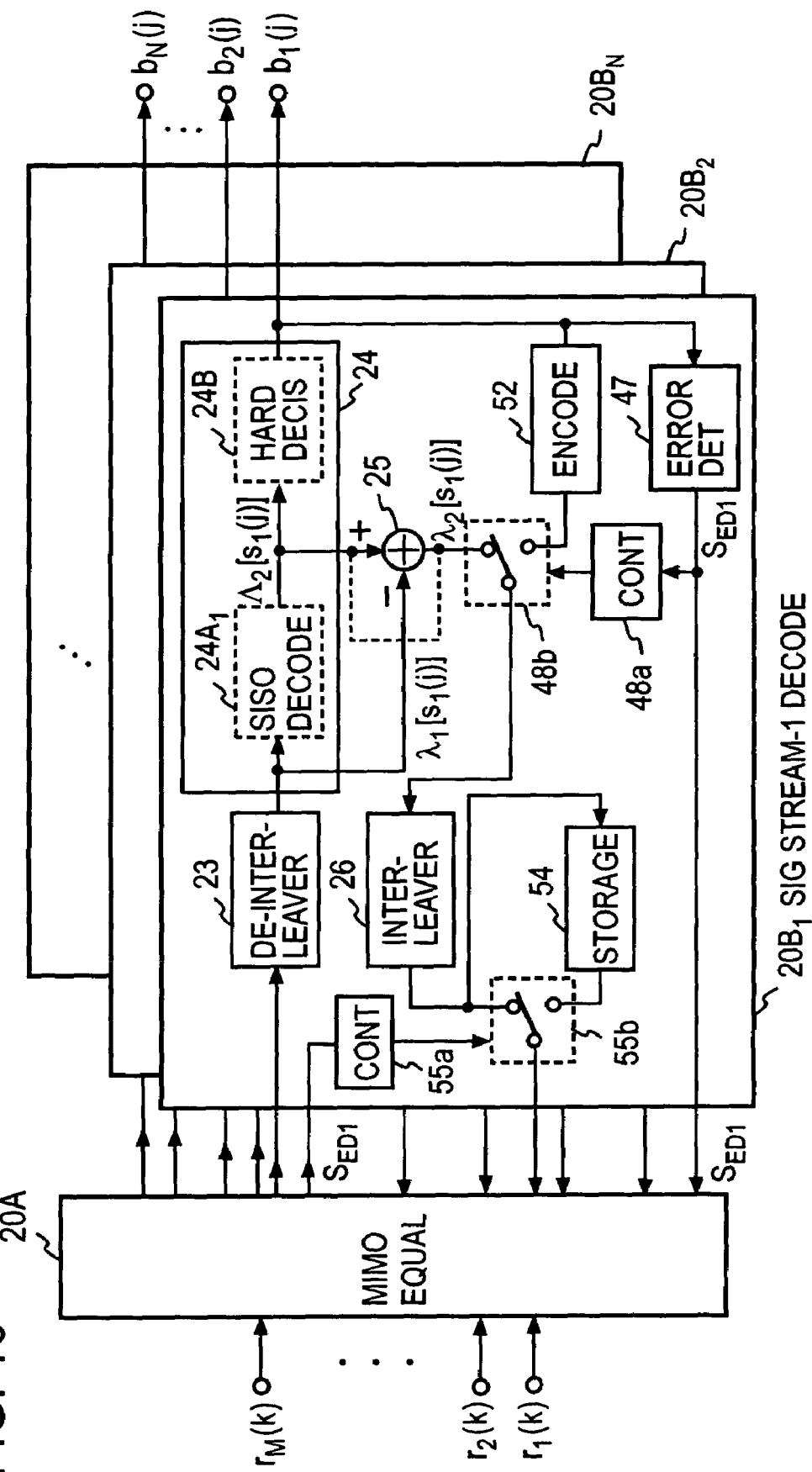
FIG. 16 is a block diagram illustrating the functional configuration of the principal part of a fourth embodiment of the present invention.

FIG. 16 illustrates in block form an example of the functional configuration of the signal stream-i decoding part $20B_1$ in FIG. 3. The channel decoder 24 contains a SISO decoder $24A_1$ and a hard decision part 24B. In the hard decision part 24B the LLR (Log-Likelihood Ratio) $\Lambda_2[s(j)]$ is subjected to hard decision, and the decision result is output as the decision bit stream $b_1(j)$ of the signal stream 1. The decision bit stream $b_1(j)$ is input to an error detecting part 47, which performs error detecting processing using the CRC code and outputs error detection information $S_{ED1}$ indicating whether an error was detected or not.

Figure 17:
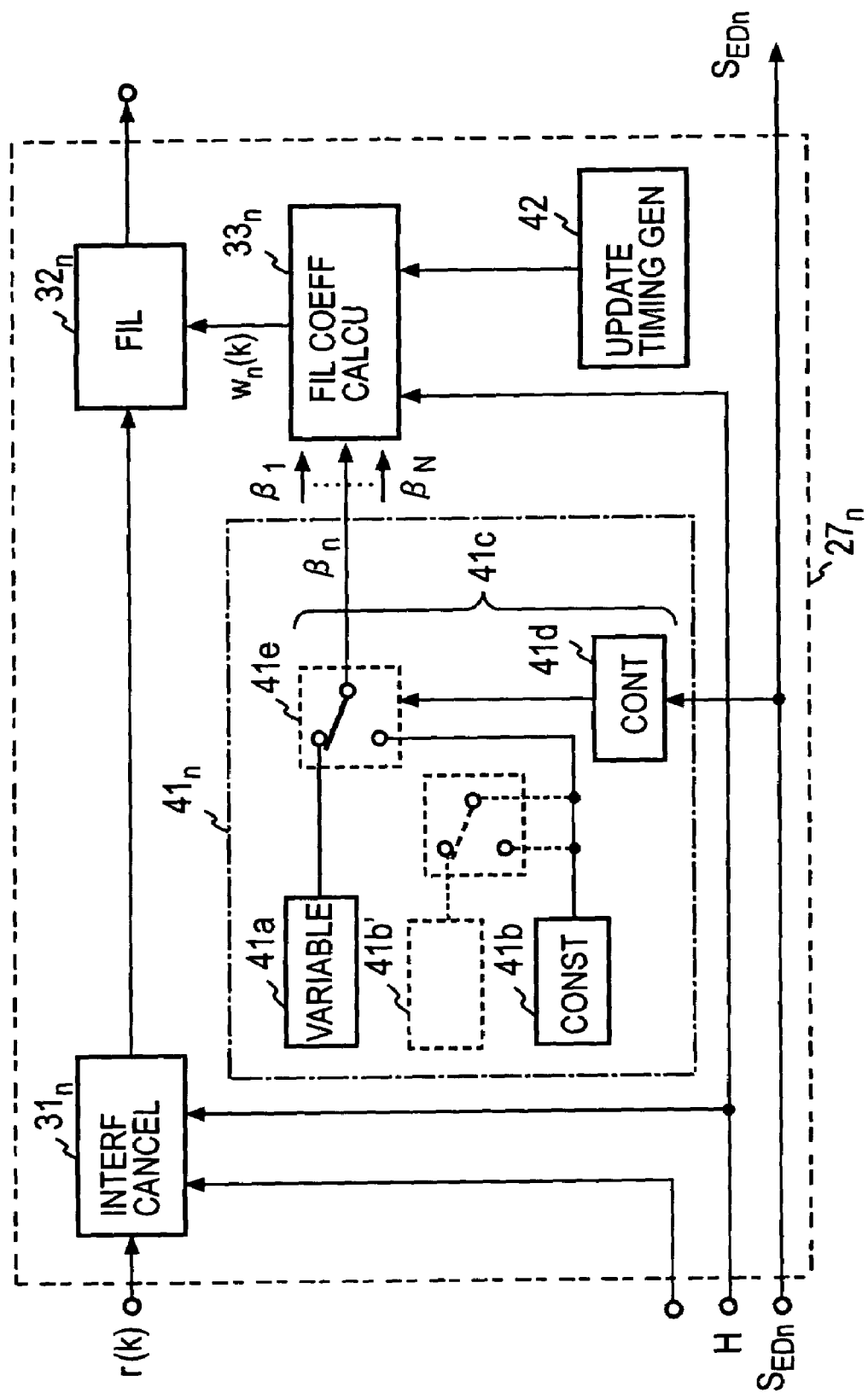
FIG. 17 is a block diagram showing the functional configuration of part of a MIMO equalizer 21 in FIG. 16

Similarly, the signal stream-n decoding part $20B_n$ outputs error detection information $S_{Edn}$, which is input to the degree-of-interference-cancellation estimation part $41_n$ of the adaptive equalizing part $27_n$ for the signal stream n as shown in FIG. 17 in correspondence to FIG. 12. The equalizing part $27_n$ equalizes only an error-detected signal stream and does not equalize an error-free signal stream. The degree-of-interference-cancellation estimation part $41_n$ has a variable part $41a$ and a constant part $41b$, and based on the error detection information $S_{Edn}$, select means $41c$ is controlled to output the output from either one of the variable part 41 and the constant part $41b$ as the degree of interference cancellation $\beta_n$.

The variable part $41a$ outputs a value which varies according to the iteration processing state, such as the function value by Eq. (24) which uses the iteration number I as a variable as described previously with respect to the first embodiment, or the function value by Eq. (25) or (25') which uses the soft decision value $s'_n(k)$ as a variable as described previously with respect to the second embodiment. The constant part $41b$ outputs a constant which indicates satisfactory interference cancellation, that is, the maximum value 1 of the degree of interference cancellation, or a value close thereto, for instance, 0.98. When the error indication information $S_{Edn}$ indicates the presence of an error, a control part supplied with the error detection information $S_{Edn}$ controls a switch $41e$ to connect the output side of the variable part $41a$ to the filter coefficient calculating part $33_n$. Accordingly, the filter coefficient calculating part $33_n$ is supplied with the degrees of interference cancellation $\beta_1$ to $\beta_N$ for all of the signal streams, and calculates the filter coefficients $w_n(k)$ based on Eqs. (22), (23), or (22'), (23'), or (27). The subsequent operations are the same as in the first to fourth embodiments.

When the error detection information $S_{Edn}$ indicates the absence of an error, the switch $41e$ is controlled by the control part $41d$ to connect the output side of the constant part $41b$ to the filter coefficient calculating part $33_n$. Accordingly, for that one of the degrees of interference cancellation $\beta_1$ to $\beta_N$ input to the filter coefficient calculating part $33_n$ which corresponds to indicated error-free by the error detection information $S_{Edn}$, the constant $\beta$ is set to $\beta=1$, for instance, that is, the interference with the corresponding signal stream n is regarded as having completely been cancelled, and the filter coefficients $w_n(k)$ are calculated to cancel interference for that one of the other signal streams indicated error-detected by the error detection information. For the signal stream detected error-free, the corresponding degree-of-interference-cancellation estimation part $41_n$ keeps on outputting the constant in the subsequent iterations, too. Incidentally, in this example the control part $41d$ and the switch $41e$ constitute the select means $41c$.

Further, in the signal stream-n decoding part $20B_n$ the output $S_{ED1}$ from the error detecting part 47 is input to a control part $48a$ as shown in FIG. 16. The control part $48a$ which control a switch $48b$ to connect the output side of a subtracting part 25 to the interleaver 26 or connect the output side of an encoding part 52 to the interleaver 26, depending on whether the error detection information $S_{ED1}$ indicates the presence or absence of an error. Accordingly, if an error is detected, the first a priori information $\lambda_1[s_1(j)]$ output from the de-interleaver 23 is subtracted in the subtracting part 25 from the LLR $\Lambda_2[s_1(j)]$ provided in the SISO decoder $24A_1$, and the resulting second a priori information $\lambda_2[s_1(j)]$ is provided to the interleaver 26. If no error is detected, the output bit stream $b_1(j)$ from the hard decision part 24B is subjected again to error correcting encoding in the encoding part 52, and the symbol stream is provided to the interleaver 26. As indicated by the broken lines, the LLR $\Lambda_2[s(j)]$ may be provided as the second a priori information to the interleaver 26 in place of the output from the subtracting part 25. This applied to other embodiments, and the LLR may be used as the second a priori information to calculate the degree of interference cancellation in the second embodiment, for instance. Further, the output from the interleaver 25 is provided as the second a priori information to the MIMO equalizer 20A, and it is also stored in a storage part 54 having stored therein the second a priori information generated in the precious iteration, and consequently, the stored information is incessantly updated. From the MIMO equalizer 20A the error detection information $S_{ED1}$ on the corresponding signal stream in the previous iteration is input to a control part $55a$. The control part $55a$ controls a switch $55b$ to provide the second a priori information from the interleaver 26 to the MIMO equalizer 20A or the second a priori information generated in the previous iteration and stored in the storage part 54 to the MIMO equalizer 20A, depending on whether the error detection information $S_{ED1}$ indicates the presence or absence of an error. For the signal stream in which no error was detected, no decoding process is performed in the current and subsequent iterations. If no error is detected, the output form the hard decision part 24B or the encoding part 52, generated in the current iteration, may be stored for use in the subsequent iterations.

In the case where the constant to be stored in the constant part $41b$ (FIG. 17) is set to 1 and the soft decision value $s'_n(k)$ is used as the information on the iteration processing state as described previously in respect of the second embodiment, $s'_n(k)=1$ and the degree of interference cancellation $\beta_n$ also becomes 1 when no error is detected; hence, when no error is detected in the signal stream n, the filter coefficient calculation is simple even if the constant part $41b$ is not provided. If, however, provision is made to switch between the variable part $41a$ and the constant part $41b$ by use of the error detection information $S_{ED1}$ as referred to previously, the computational complexity in the degree-of-interference-cancellation estimation part $41_n$ for the corresponding signal stream can be reduced when no error is detected.

If the constant to be stored in the constant part $41b$ is set not only to 1 but also to a value smaller than 1 but close thereto, for example, 0.98, when an interference cancellation error remain due to a channel estimation error, it is possible to calculate the filter coefficients $w_n(k)$ taking the residual interference into consideration. That is, when no error is detected for the signal stream n, the equalization therefor need no longer be improved, but when $\beta_n=1$ in the equalization for other signal streams, the interference by the signal stream n is neglected as seen from Eqs. (22') and (23'); hence, as mentioned previously, there is the possibility that interference due to a channel estimation error remains in the output from the interference canceling part $31n$ for other users (signal streams), and this residual interference cannot be cancelled. But, when an error is detected in the signal stream n, setting the degree of interference cancellation $\beta_n$ for the signal stream to 1 or a value close thereto permits calculation of filter coefficients taking into account the interference due to a channel estimation error, making it possible to suppress residual interference for other signal streams than that n.

The constant to be stored in the constant part $41b$ need not always be a fixed value. For example, as described previously with reference to FIGS. 4 to 6 based on the afore-mentioned European Patent Publication EP1233565A2, if the channel estimation is made using a reliable hard decision value in the data symbol obtained by the previous iteration, an accurate channel estimation value can be obtained for each iteration. In this case, the degree of interference cancellation $\beta_n$ of the signal steam with no error detected may be set to slight increase such that it is, for example, 0.97 when an error was no longer detected for the first time and 0.98 in the next iteration. Further, as described previously in respect of the second embodiment, when the channel condition in one frame differs between the first and second half periods, the degree of interference cancellation $\beta_n$ is calculated for each of them, but when an error is no longer detected in such a state, the constant may be changed in one frame in accordance with the degree of interference cancellation $\beta_n$ obtained so far; for example, 0.97 for the lower $\beta_n$ and 0.98 for the higher $\beta_n$. In the case of changing the constant as mentioned above, another constant part $41b'$ is provided as indicated by the broken line, and the constant parts $41b$ and $41b'$ are selectively used. The constant to be set in the constant part 41 b may be re-set.

Procedure

Figure 18:
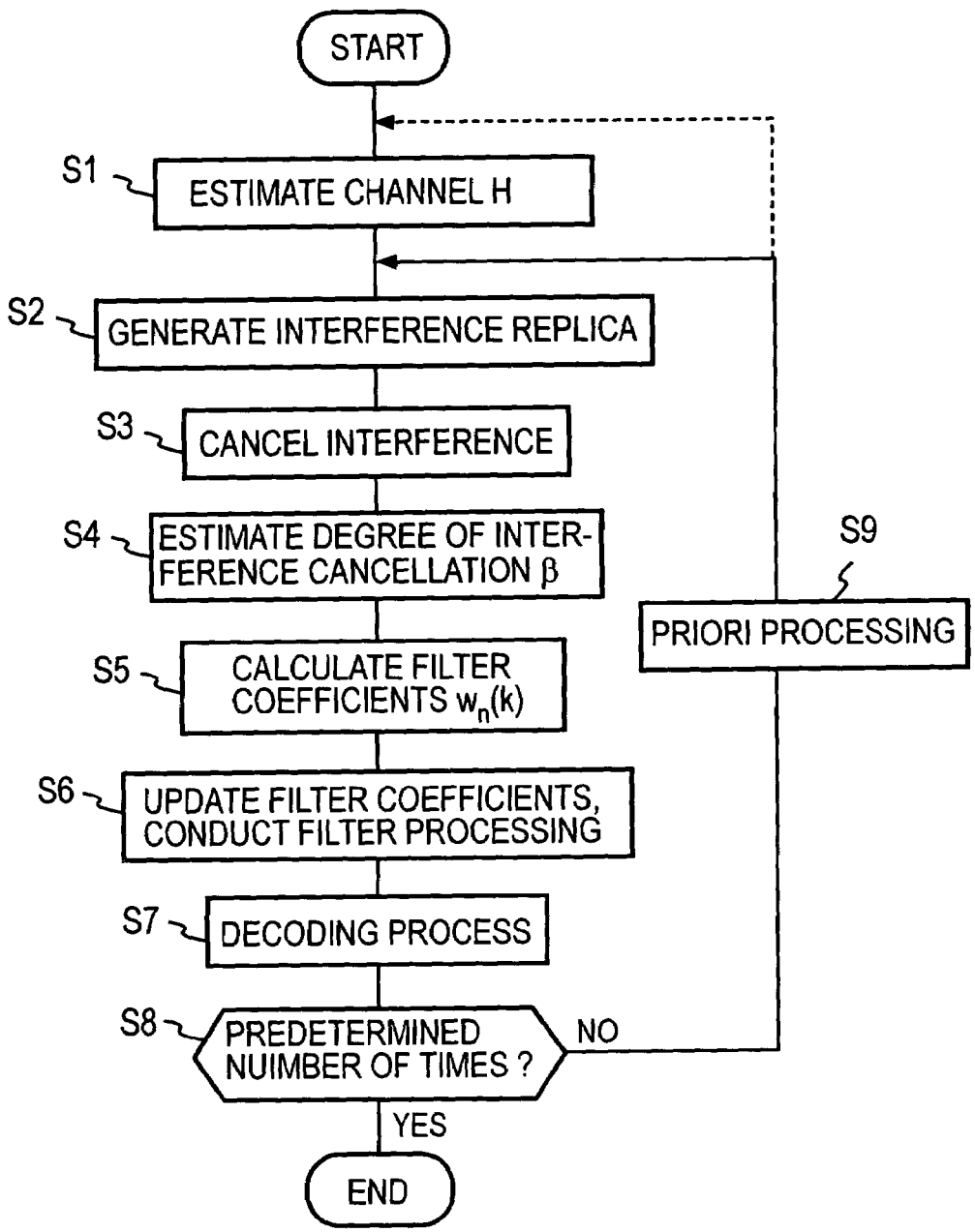
FIG. 18 is a flowchart showing an embodiment of this invention method.

A brief description will be given of the procedure of each of the above embodiments according to the present invention. As depicted in FIG. 18, the channel value H (Eq. (3)) between each transmitter $S_n$ (where n=1, . . . , N) and each of the antennas #1 to #M is estimated in the channel estimation part 21 C (see FIG. 4) (step S1), then the channel value H and the soft decision values $\lambda_2[s_1(k)]$ to $\lambda_2[s_N(k)]$ are used to a received signal replica of an interference signal (interference replica) $Hu_{e,n}(k)$ in the replica generating part $34_n$ (step S2), and the interference replica is subtracted from the received signal r(k) in the subtracting part $35_n$ to cancel interference as expressed by Eq. (10) (step S3). In the present invention the information based on the iteration processing state is used to estimate, in the degree-of-interference-cancellation estimation part $41_n$ (FIGS. 12, 14, 15 and 17), the degree of interference cancellation $\beta$ or $\beta_n$ indicating the degree of residual interference in the output in step S3 (step S4).

Next, the degree of interference cancellation $\beta$ or $\beta_1$ to $\beta_N$ and the channel estimation value H are used to calculate the filter coefficients $w_n(k)$ in the filter coefficient calculating part $33_n$ (FIGS. 12, 14, 15 and 17) (step S5). The thus calculated filter coefficients $w_n(k)$ are used to update the filter coefficients of the filter part $32_n$, wherein the output from the subtracting part $35_n$ (see FIG. 6) of the interference canceling part $31_n$ is subjected to filtering to suppress the residual interference components (step S6). The filtered signal is decoded (step S7). Thereafter, a check is made to see whether the iteration number has reached a predetermined value (step S8), and if not, the second a priori information is calculated for the decoded signal stream, followed by the return to step S2 (step 9). When it is found in step 8 that the iteration number has reached the predetermined value, the hard decision bit string in step S7 at that time is output and the procedure ends. That is, this embodiment differs from the afore-mentioned document EP1233565A2 in that the degree-of interference-cancellation estimation step is added to the procedure described in reference to the document so that the estimated degree of interference cancellation is used as a substitute for the soft decision value to calculate the filter coefficients $w_n(k)$.

Figure 19:
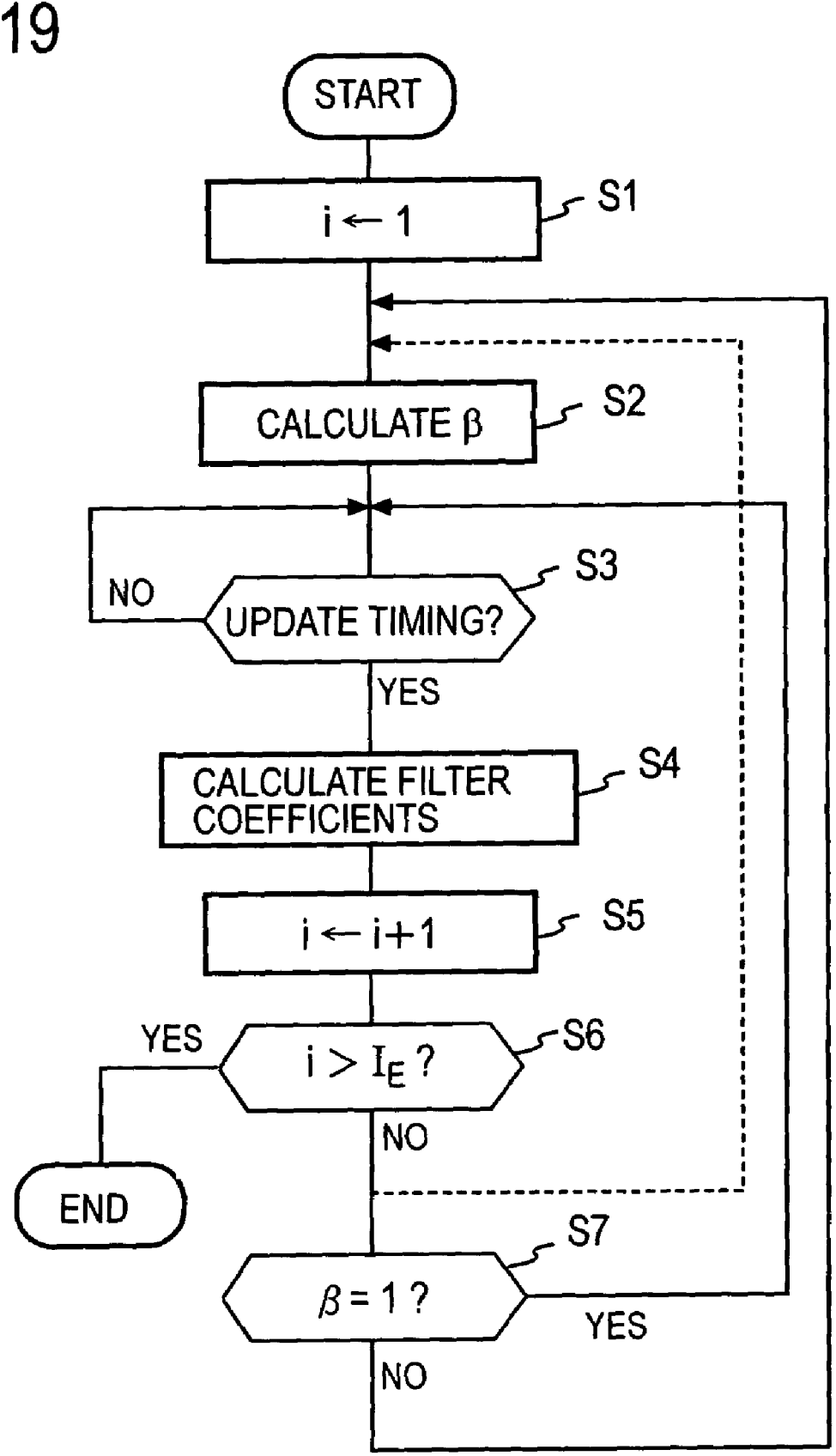
FIG. 19 is a flowchart showing a concrete example of an interference-cancellation-degree estimation step S4 in FIG. 18.

Turning next to FIG. 19, a description will be given of an example of the procedure for calculating the filter coefficients $w_n(k)$ by the filter coefficient calculating part $33_n$ (FIG. 12) in the first embodiment. The procedure start with initializing the iteration number i to 1 in step S1. In step S2 the function value using the number i as a variable is calculated, for example, by Eq. (24) to obtain the degree of interference cancellation $\beta$. In this state the procedure awaits the generation of an update timing signal in step S3, and upon generation of the update timing signal, the procedure goes to step S3, in which the degree of interference cancellation $\beta$ obtained in step S2 and the channel value H are used to calculate the filter coefficients $w_n(k)$. Next, upon completion of the iteration, the iteration number i is incremented by one in step S5, and in step S6 a check is made to see if the number i has exceeded the last iteration number $I_E$, and if not so, the procedure returns to step S2. If it is found in step S6 that i has exceeded $I_E$, then the procedure ends, and if the degree of interference cancellation $\beta$ is 1 in step S7, the procedure returns to step S3. Incidentally, if i is not larger than $I_E$ in step S6, the procedure may return to step 2, omitting step S7.

Figure 20:
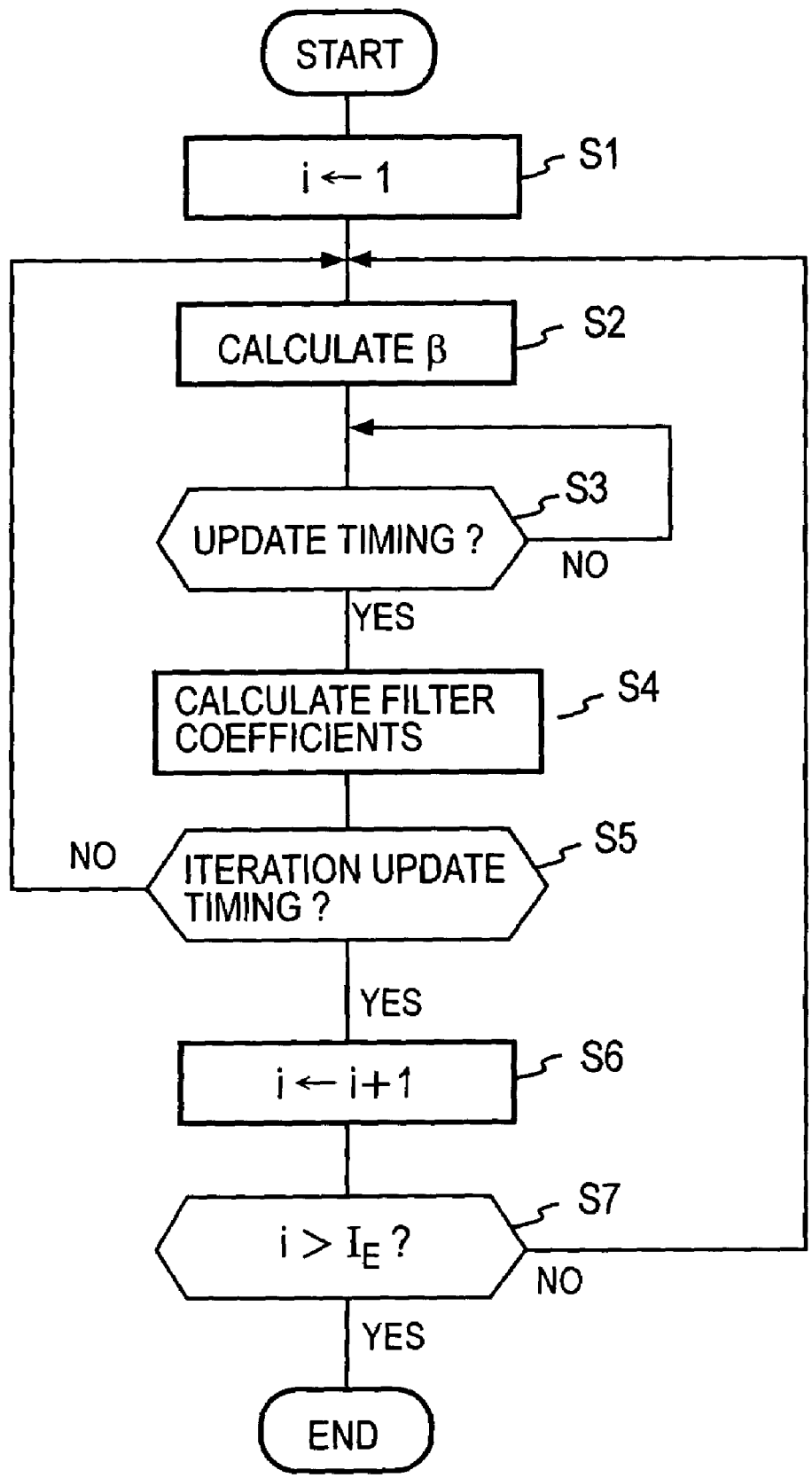
FIG. 20 is a flowchart showing another concrete example of step S4 in FIG. 18.

Referring next to FIG. 20, a description will be given of an example of the procedure for calculating filter coefficients in the second embodiment. In the first place, the iteration number i is initialized to 1 in step S1, then in step S2 the soft decision value is used to calculate the degree of interference cancellation $\beta$ or $\beta_n$ by Eq. (25) or (25'), then in step S3 the procedure awaits the generation of the update timing signal, and on generation of the update timing signal, the procedure goes not step S4, in which the degree of interference cancellation calculated in step S2 and the channel estimation value H are used to calculate the filter coefficients $w_n(k)$. In step S5 a check is made to see if the update timing signal generated instep S3 is based on the update of the iteration, and if not, the procedure returns to step S2, and if the timing signal is based on the updating of the iteration, the iteration number i is incremented by one in step S6. Then in step S7 a check is made to see if the iteration number I is in excess of the last iteration number $I_E$, and if not, the procedure returns to step S2, whereas when i is excess of $I_E$, the procedure ends.

Figure 21:
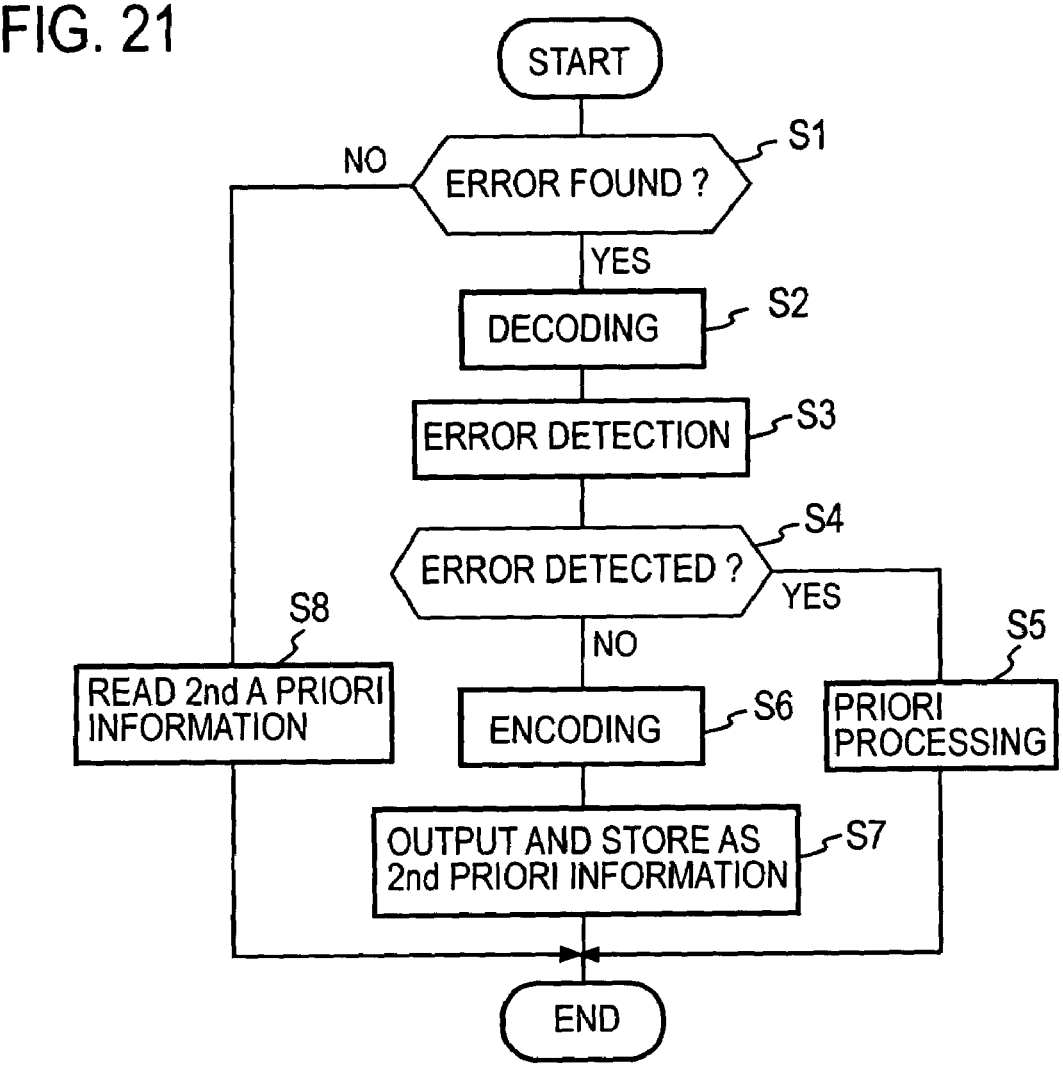
FIG. 21 is a flowchart showing another example of a decoding step S7 in FIG. 18.

Next, a description will be given, with reference to FIG. 21, of an example of the procedure of the signal stream-n decoding part in the fourth embodiment. In the first place, a check is made (by the control part $55a$) in step S1 to see if the error detection information $S_{EDn}$ input from the MIMO equalizer 20A (FIG. 16) indicates the presence of an error, and if so, the decoding (by the decoder 24) is carried out in step S2, and in step S3 the hard decision bit string is subjected to error detection processing (by the error detecting part 47). In step S4 a check is made to see if an error was detected, and if an error was detected, the procedure goes to step S5, in which the second a priori information is generated from the information obtained by the decoding in step S2, that is, the same processing of step S9 in FIG. 18 is performed.

If it is found in step S4 that no error was detected, the previously-obtained hard decision bit string is subjected to error correction encoding and, if necessary, to symbol mapping in step S6, and in step S7 its encoded string or symbol string is output as the second a priori information and, at the same time, it is stored in the storage part 54. If it is found in step S1 that the error detection information $S_{Edn}$ indicates the absence of an error, then the second a priori information in the storage part 54 is read out therefrom in step S8.

Figure 22:
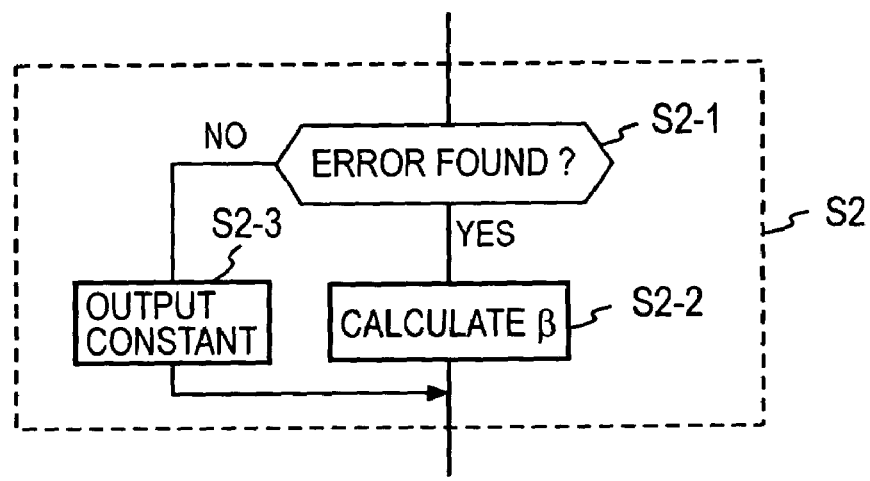
FIG. 22 is a flowchart showing a modified form of step S2 in FIGS. 19 and 20.

The degree-of-interference-cancellation estimation in the fourth embodiment may be made by conducting, as shown in FIG. 22, the degree-of-interference-cancellation calculation in step S2 in FIG. 19 or 20. That is, in step S2-1 it is checked whether the input error detection information $S_{Edn}$ indicates the presence or absence of an error, and if it indicates the presence of an error, then a functional calculation is conducted to obtain the degree of interference cancellation β in step S2-2, and the calculated result is set to $β_n$. When it is found in step S2-1 that no error was detected, a constant 1 or close thereto is set as the degree of interference cancellation $β_n$.

In the above embodiments the signal streams 1 to N are processed in parallel as shown in FIGS. 3 and 3, but the present invention may be applied as well to such a serial processing scheme as described, for example, in Sirikiat Lek Ariyavisitakul, "Turbo Space-Time Procession to Improve Wireless Channel Capacity," IEEE TRANSACTIONS ON COMMUNICATIONS, VOL. 48, AUGUST 2000. In such an instance, the signal steams 1 to N are processed in a predetermined order, for example, in the order 1, 2, . . . , N, and the result of processing of other signal streams performed until then to be used in the processing of each signal stream n (1, . . . , N) is: the result obtained by the current iteration for the signal streams 1, . . . , n−1; and the result obtained in the previous iteration for the signal steams n, . . . , N. And in the case of receiving and equalizing a symbol stream transmitted by OFDM (Orthogonal Frequency Division Multiplex) for each signal stream n, adaptive equalization is performed for each identical subcarrier of he signal streams 1 to N; the present invention is applicable in this case, too.

In the above, the degree of interference cancellation β is estimated in accordance with the iteration number and the value of the current a priori information, but it may also be estimated by combining them with one or more of the information energy (received signal power) per bit, the numbers of transmit and receive antennas, the encoding rate and the number of multi-paths. In this instance, once the system to be used is determined, the optimum or quasi-optimum degree of interference cancellation β is obtained in advance by computer simulations, and the degree of interference cancellation β is used based on the iteration processing state. At any rate, it can be said that 0 is estimated based on the iteration processing state. That is, in the first embodiment the iteration number i is information about the iteration processing state, and in the second embodiment the a priori information $λ_2[s_n(k)]$ is the information about the iteration processing state.

In s system which requests retransmission when an error is detected, processing for the error-detected received signal is the first iteration and processing for the retransmitted received signal is the second iteration. The present invention is applicable not only to the MIMO system but also to a single user turbo system and a system in which on detecting an error, the receiver side requests the transmitter side for retransmission in the case where it is possible in these systems to obtain information corresponding to the a priori information $λ_2[s_n(k)]$ by some means. In the system which requests retransmission upon detection of an error, the processing for the error-detected received signal is the first iteration and the processing for the retransmitted received signal is the second iteration. In the cell diversity system, when a mobile station is capable of communicating with base stations of two adjoining cells as in the case of handover in the mobile communications, processing for the received signal from the one base station is the first iteration and processing for the received signal from the other base station is the second iteration. In the case of turbo reception in the cell diversity system, processing for the received signal from the one base station is iterated three times, after which processing for the received signal from the other base station is the fourth iteration.

The adaptive equalizing apparatus of the present invention can also be implemented under computer control. In such an instance, computer programs for performing the respective steps of the procedures of FIGS. 18 to 20 and, if necessary, the procedures of FIGS. 21 and 22, are downloaded from a CD-ROM, magnetic disk, or similar recording medium, or via a communication channel to the computer for executing the programs.

Experimental Example

To demonstrate the effect of the present invention, a characteristic evaluation was made by computer simulations. The parameters used in the simulations are as follows:

| | |
|---|---|
| Number of Buses | Q = 3 |
| Number of Simultaneously Transmitting Users | N = 3 |
| Number of receive antennas | M = 2 |
| Number of Iterations of Equalization and Decoding | 5 |
| Modulation System | BPSK |
| Channel | Equal-Level 3 Path Rayleigh |
| Channel Estimation | Perfect |
| Decoding Algorithm | Max-Log-MAP |
| Encoding Rate | 2 |
| Constraint Length | 3 |

Figure 23:
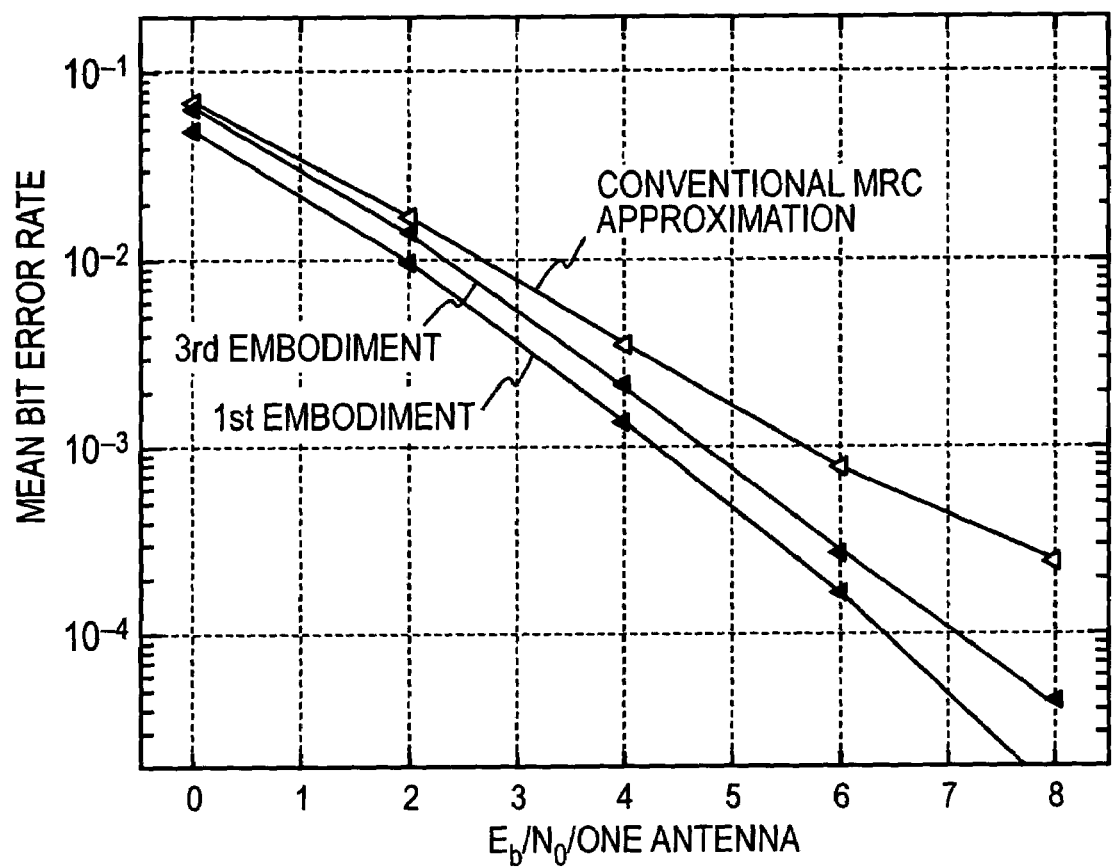
FIG. 23 is a graph showing results of computer simulations, indicating the effect of the present invention.

FIG. 23 shows average BER (Bit Error Rate) characteristics in the cases of using the conventional MRC approximation scheme and schemes of the first and third embodiments of the present invention. Further, β(i) and $f(s'_n)$ in the first and third embodiments were set as follows:

$$β(i)=0 \text{ for } i=1$$

$$β(i)=0.8+0.05×(i-1) \text{ for } 5 \geq i \geq 2$$

$$β(i)=1 \text{ for } i \geq 6 \tag{31}$$

$$f(s'_n(k))=0.15×s'_n(k) \tag{32}$$

It can be seen from FIG. 23 that the scheme of the first embodiment sharply improves the BER characteristic as compared with that in the case of using the MRC approximation scheme. This is considered to be due to the fact that in the case of using the MRC approximation, MRC in the second and subsequent iterations lessens the interference suppressing effect, causing SINR (Signal to Interference Noise Ratio) to fall. In contrast thereto, in the first embodiment of the present invention β(i) is held unchanged in the frame, but as the iteration number increases, β(i) is increased to thereby heightens the interference suppression effect to increase SINR when the iteration number is small.

Further, it can be understood that the scheme of the third embodiment permits further reduction of the BER characteristic. The reason for this is considered to be due to the fact that the resistance to error by interference or noise is further improved by using in the equalization process the a priori information value corresponding to the symbol to be detected as well as the a priori information values corresponding to MAI and ISI.

EFFECT OF THE INVENTION

As described above, according to the present invention, the filter coefficients need not be calculated for each symbol period, but instead they need only to be calculated at the beginning of the period during they are held unchanged. Besides, the degree of interference cancellation is estimated in accordance with information based on the iteration processing state, and the estimated value is used to calculate filter coefficients; hence it is possible to implement an excellent reception characteristic with low computational complexity.

What is claimed is:

1. An adaptive equalizing apparatus comprising:
   interference canceling means supplied with a received signal, a channel estimation value and an a priori information stream, for canceling an interference component in said received signal;
   a filter part supplied with said interference-cancelled received signal, for suppressing interference and for combining multi-path components;
   an interference-cancellation-degree estimation part supplied with information based on the state of iteration processing of said received signal, for estimating the degree of interference cancellation;
   update timing generating means supplied with at least an iteration start signal, for generating a filter coefficient update timing signal for each period during which the filter coefficients of said filter part are held unchanged; and
   filter coefficient calculating means supplied with the degree of interference cancellation, the channel estimation value and said update timing signal, for calculating the filter coefficients of said filter part upon each generation of said update timing signal.

2. The apparatus of claim 1, which further comprises means for calculating a function value which uses, as a variable, that one of received signals obtained by the previous iteration which is to be detected, and wherein:
   said interference canceling means is means which is also supplied with said function value and increases the component of said signal to be detected in said received signals; and
   said filter coefficient calculating means is means which is also supplied with said function value and calculates calculating filter coefficients.

3. The apparatus of claim 1 or 2, wherein said degree-of-interference-cancellation estimation part is means which is supplied with the iteration number as said information based on the state of iteration processing and generates the degree of interference cancellation which becomes higher as said iteration number increases.

4. The apparatus of claim 1 or 2, wherein said degree-of-interference-cancellation estimation part is means which is supplied with the iteration number as said information based on the state of iteration processing and, upon each generation of said update timing signal, outputs, as the degree of interference cancellation, a function value which uses, as a variable, a priori information from the previous update timing signal to the current update timing signal.

5. The apparatus of claim 4, wherein said degree-of-interference-cancellation estimation part is means which is supplied with the iteration number as said information based on the state of iteration processing and, upon each generation of said update timing signal, generates the degree of interference cancellation based on the function value of said a priori information and said iteration number, said degree of interference cancellation becoming higher as the function value of said a priori information increases and as said iteration number increases.

6. The apparatus of claim 2, wherein said degree-of-interference-cancellation estimation part is supplied with a receiving energy per information bit, receiving power, a number of transmit and receive antennas, a number of multi-paths, or encoding ratio, or a combination of them, and uses an input also being used for estimation of the degree of interference cancellation.

7. The apparatus of claim 1 or 2, wherein said update timing generating means is means which is also supplied with said channel estimation value and outputs said update timing signal each time the difference between the channel estimation value immediately after the previous filter coefficient calculation and the current channel estimation value exceeds a square sum.

8. The apparatus of claim 1 or 2, which receives signals from N transmitters and performs turbo equalization for each of signal streams from said N transmitters, said N being an integer equal to or greater than 1;
   said apparatus comprising:
   n external information value generating parts each of which is supplied with the output from said filter part of each signal stream and calculates an external information value; and
   N soft-input soft-output decoders each of which is supplied with said external information value from one of said N external information value generating parts, performs soft-input soft-output decoding by use of redundancy concerning error correction added in an encoder of one of said N transmitters and outputs a decoded bit as a temporary or final received signal, and outputs an external information value or log-likelihood ratio of said bit as said a priori information stream; and
   wherein equalization and decoding processes are iterated while updating said a priori information value with new values one after another.

9. The apparatus of claim 8, wherein:
   said degree-of-interference-cancellation estimation part is means provided for each of said signal streams and supplied with error detection result information from the corresponding one of said soft-input soft-output decoders, said degree-of-interference-cancellation estimation part outputting the degree of interference cancellation estimated from information based on said iteration processing state when said error detection result information indicates the presence of an error and outputting a constant as the degree of interference cancellation when said error detection result information indicates the absence of an error.

10. A program for controlling a computer having a memory storage to function as an adaptive equalizing apparatus which comprises:
    interference canceling means supplied with a received signal, a channel estimation value and an a priori information stream, for canceling an interference component in said received signal;
    a filter part supplied with said interference-cancelled received signal, for suppressing interference and for combining multi-path components;
    an interference-cancellation-degree estimation part supplied with information based on the state of iteration processing of said received signal, for estimating the degree of interference cancellation;
    update timing generating means supplied with at least an iteration start signal, for generating a filter coefficient update timing signal for each period during which the filter coefficients of said filter part are held unchanged; and
    filter coefficient calculating means supplied with the degree of interference cancellation, the channel estimation value and said update timing signal, for calculating the filter coefficients of said filter part upon each generation of said update timing signal.

* * * * *